(12) United States Patent
Chang et al.

(10) Patent No.: US 6,769,014 B1
(45) Date of Patent: Jul. 27, 2004

(54) METHOD, SYSTEM AND COMPUTER PRODUCT FOR PROVIDING AN OBJECT CLASS BASED DISTRIBUTED VIRTUAL MAILBOX AND POST OFFICE FOR COMMUNICATING ELECTRONIC MAIL MESSAGES BETWEEN REMOTE COMPUTERS

(75) Inventors: Daniel T. Chang, San Jose, CA (US); Neelakantan Sundaresan, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/108,854

(22) Filed: Jul. 1, 1998

Related U.S. Application Data

(62) Division of application No. 08/884,457, filed on Jun. 27, 1997.

(51) Int. Cl.[7] .............................. G06F 15/16; G06F 7/00
(52) U.S. Cl. ........................... 709/206; 707/10; 707/103
(58) Field of Search ................................. 709/217, 218, 709/219, 206, 238, 225, 245, 201; 379/93.24, 100.08, 265.09; 705/406

(56) References Cited

U.S. PATENT DOCUMENTS

| | | | |
|---|---|---|---|
| 5,327,558 A | | 7/1994 | Burke et al. .................... 710/8 |
| 5,436,960 A | * | 7/1995 | Campana, Jr. et al. ......... 379/58 |
| 5,459,717 A | * | 10/1995 | Mullan et al. ................. 370/54 |
| 5,627,764 A | | 5/1997 | Schutzman et al. .......... 709/207 |
| 5,634,127 A | | 5/1997 | Cloud et al. ................. 709/313 |
| 5,680,551 A | | 10/1997 | Martino ....................... 709/206 |
| 5,689,550 A | | 11/1997 | Garson et al. .............. 379/88.1 |
| 5,715,474 A | | 2/1998 | Burke et al. .................... 710/6 |
| 5,757,669 A | | 5/1998 | Christie et al. .............. 709/205 |
| 5,822,526 A | * | 10/1998 | Waskiewicz ................. 709/206 |
| 5,930,471 A | * | 7/1999 | Milewski et al. ............ 709/204 |
| 5,941,946 A | * | 8/1999 | Baldwin et al. ............. 709/206 |
| 5,944,786 A | * | 8/1999 | Quinn ......................... 709/206 |
| 5,951,638 A | * | 9/1999 | Hoss et al. .................. 709/206 |
| 5,974,449 A | * | 10/1999 | Chang et al. ................ 709/206 |

OTHER PUBLICATIONS

Aglets Workbench, IBM, URL = http://www.trl.ibm.co.jp/aglets.

D. T. Chang and D. B. Lange, "Mobile Agents: A New Paradigm for Distributed Object Computing on the WWW", in Proceedings of the OOPSLA96 Workshop: Toward the Integration of WWW and Distributed Object Technology, Oct., 1996.

Concordia, Mitsubishi Electric ITA, URL = http://www.meitca.com/HSL/Projects/Concordia.

"Concordia: An Infrastructure for Collaborating Mobile Agents", Mitsubishi Electric ITA, First International Workshop on Mobile Agents 97 (MA'97), Apr., 1997.

(List continued on next page.)

*Primary Examiner*—Jack B. Harvey
*Assistant Examiner*—Beatriz Prieto
(74) *Attorney, Agent, or Firm*—Prentiss W. Johnson

(57) ABSTRACT

A Mail Facility Layer providing a general, semantics-free mail paradigm for asynchronous communication between distributed objects. It provides a level of abstraction in terms of mail, virtual mailbox, post office, and mail queue. It hides the details of implementation and transport and provides location transparency. A mail is asynchronously communicated between distributed objects by associating a destination with a name, wherein the destination is located on a remote system; associating the name with a first virtual mailbox representing the destination, wherein the first virtual mailbox is located on a local system; creating the mail; opening the first virtual mailbox; putting the mail in the first virtual mailbox; sending the mail from the first virtual mailbox to a second virtual mailbox, wherein the second virtual mailbox is located on the remote system; opening the second virtual mailbox; and getting the mail from the second virtual mailbox.

27 Claims, 16 Drawing Sheets

OTHER PUBLICATIONS

"The Common Object Request Broker: Architecture and Specification", Revision 2.0, OMG, Jul., 1995.

InfoSleuth Project, URL = http://www.mcc.com/projects/infosleuth.

The Java Development Kit (JDK), URL http://java.sun.com/products/jdk.

JKQML, IBM, URL =http://www.alphaworks.ibm.com/formula/jkqml/.

Y. Labrou, "Semantics for an Agent Communication Language", Ph.D. Thesis, CSEE Department, University of Maryland, Baltimore Maryland, Sep., 1996. URL = http://www.cs.umbc.edu/kqml.

MA'97 (First International Workshop on Mobile Agents 97), URL = http:www.informatik.uni–stuttgart.de/ipvr/vs/ws/ma97/ma97.html.

"Mobile Agent Computing, A White Paper", Mitsubishi Electric ITA, Feb. 28, 1997, http://www.meitca.com/HSL/Projects/Concordia.

Voyager, ObjectSpace, 1997, http://www.objectspace.com/Voyager/voyager1.html.

"Voyager Core Package Technical Overview", ObjectSpace, Mar., 1997.

"JavaSpace Specification", Revision 0.3, Sun Microsystems, Inc., Mar. 1997.

N. Carriero and D. Gelernter, "Linda in Context", Communications of the ACM, 32(4), pp. 444–458, Apr., 1989.

J. Waldo, G. Wyant, A. Wollrath and S. Kendall, "A Note on Distributed Computing", Sun Microsystems Laboratories Technical Report SMLI TR–94–29, Nov. 1994.

D. Chess, B. Grosof, C. Harrison, D. Levine, C. Parris, and G. Tsudik, "Itinerant Agents for Mobile Computing", IBM Research Report, RC 20010, IBM Research Division, Mar. 1995.

C. Harrison, D. Chess, and A. Kershenbaum, "Mobile Agents: Are they a good idea?", IBM Research Report, IBM Research Division, Mar. 1995.

Visual Warehouse, IBM, URL = http://www.software.ibm.com/data/warehouse/vw.

Wise (Wonderful Indexing and Searching Environment), IBM, URL = http://wise.watson.ibm.com.

* cited by examiner

Sending a message

Receiving a message

METHOD, SYSTEM AND COMPUTER PRODUCT FOR PROVIDING AN OBJECT CLASS BASED DISTRIBUTED VIRTUAL MAILBOX AND POST OFFICE FOR COMMUNICATING ELECTRONIC MAIL MESSAGES BETWEEN REMOTE COMPUTERS

CROSS REFERENCE TO OTHER APPLICATIONS

This application is a divisional of co-pending and commonly-assigned patent application Ser. No. 08/884,457, filed Jun. 27, 1997, by the referenced inventors and entitled "Method Of, System For, and Computer Program Product for Providing a Communication Infrastructure for an Agent System," which application is hereby incorporated by reference.

BACKGROUND OF THE INVENTION

1. Field of the Invention

The present invention relates in general to agent computer programs, including mobile agents, intelligent agents, collaborating agents, internet agents, and task-specific agents, and more particularly to a communication infrastructure for communication between agents, between agents and agent-hosting servers, and between agent-hosting servers.

2. Description of the Related Art

Java virtual machines are rapidly becoming available on all kinds of computing platforms, from portables to desktops to workstations to mainframes. For the first time in computing history, there may soon be available a virtual, homogeneous platform for distributed and parallel computing on a global scale. The basic elements of this computing platform are distributed Java objects. Prior to JDK 1.1 [The Java Development Kit (JDK), URL=http://java.sun.com/products/jdk], one had to use the low-level socket-based class library (java.net package) for communication between distributed Java objects. With JDK 1.1, one can now use Java RMI (Remote Method Invocation) for direct method invocation between Java distributed objects. Java RMI raises the level of communication to that of objects, and it can pass objects by value using Java object Serialization. However, Java RMI is stationary (remote objects), rigid (predefined methods calls), point-to-point, and connection-oriented. Therefore, it is still too low-level and inflexible for direct use in many applications, such as agent-based applications.

The term "agent" has been used to mean different things in different contexts [D. Chess, B. Grosof, C. Harrison, D. Levine, C. Paris, and G. Tsudik, "Itinerant Agents for Mobile Computing", IBM Research Report, RC 20010, IBM Research Division, March 1995; C. Harrison, D. Chess, and A. Kershenbaum, "Mobile Agents: Are they a good idea?", IBM Research Report, IBM Research Division, March 1995.]—from intelligent agents to internet agents to mobile agents to task-specific agents to user agents, just to name a few. A key, distinct characteristic of agents, from our perspective, is that agents are autonomous. An agent has its own identity, thread of execution, and lifecycle. It is this characteristic that makes the agent system, and specifically Java agent system, a unique, flexible and powerful paradigm for distributed and parallel computing [D. T. Chang and D. B. Lange, "Mobile Agents: A New Paradigm for Distributed Object Computing on the WWW", in Proceedings of the OOPSLA96 Workshop: Toward the Integration of WWW and Distributed Object Technology, October, 1996; MA '97 (First International Workshop on Mobile Agents 97), URL= http:www.informatik.uni-stuttgart.de/ipvr/vs/ws/ma97/ma97.html].

Given that Java agents are autonomous and can be executing independently on various Java virtual machines throughout a vast computer network, what makes them useful and powerful in carrying out parallel and distributed computing is that they must be able to communicate with each other in a dynamic and flexible fashion: the mechanism must allow agents to communicate when one of the agents moves to a different address space (mobile agents), when they must communicate at a higher level than methods calls (intelligent agents), when they need to communicate as a group (collaborating agents), and when a part of computer network is down or one of the agents is not available (disconnected operation).

Most of the currently available Java agent systems have focused their support on agent mobility. They provide limited support for inter-agent communication. Among these, Voyager [Voyager, ObjectSpace, URL=http://www.objectspace.com/Voyager/voyager.html; "Voyager Core Package Technical Overview", ObjectSpace, March, 1997], Concordia [Concordia, Mitsubishi Electric ITA, URL=http://www.meitca.com/HSL/Projects/Concordia; "Concordia: An Infrastructure for Collaborating Mobile Agents", Mitsubishi Electric ITA, in First International Workshop on Mobile Agents 97 (MA '97), April, 1997; "Mobile Agent Computing", A White Paper, Mitsubishi Electric ITA, Feb. 28, 1997], and Aglets [Aglets Workbench, IBM, URL=http:/Hwww.trl.ibm.co.jp/aglets] are the best known.

Voyager defines the notion of a virtual object, which is basically a proxy to a remote object. In Voyager any object can be virtualized using a program called vc, which is a utility for converting regular classes to virtual classes. Messages are sent—via method calls—to remote objects through their local virtual references. Voyager messages can be sent in a synchronous, deferred, or asynchronous (one-way) mode. Object mobility is achieved through sending a "move" message to a remote object.

Concordia supports two types of asynchronous distributed events for inter-agent communication: selected events and group-oriented events. In the select-event messaging, an agent registers the type of events it would like to receive with an event manager. When the event manager receives an event of the registered type it forwards the event to the registered agent. Concordia also supports group-oriented events. An agent can join a group of agents. When one of the agents initiates an event, the event is forwarded to all the agents in the group. Agent mobility is achieved through the use of itineraries, which involves message passing between collaborating Concordia servers.

In Aglets, agents can communicate with each other by sending messages through their proxies. The messages can be sent in a synchronous or deferred mode. Agent mobility is achieved by directly dispatching an agent (through its proxy) or through the use of itineraries. This involves message passing between collaborating agent contexts using the agent transfer protocol.

CORBA [The Common Object Request Broker: Architecture and Specification, Revision 2.0, OMG, July 1995] provides an architecture for stationary objects to communicate with each other in a distributed and heterogeneous environment. It defines a framework for remote method invocation using the IIOP (Internet Inter-ORB Protocol). Under the cover this involves sending request messages and receiving response messages between collaborating hosts.

KQML is a language of communication for intelligent agents. KQML is based on using primitives called performatives. Performatives define permissible actions or operations that agents use for communication. A performative has a name (which specifies what the performative means) and the following fields: sender, receiver, language (language of actual communication: prolog, SQL etc.), ontology (term definitions for the content), correlation id, and content.

JavaSpace ["JavaSpace Specification", Revision 0.3, Sun Microsystems, Inc. March 1997] is a Java adaptation for the internet of the pattern-matching shared memory paradigm provided by Linda [N. Carriero and D. Gelernter, "Linda in Context", Communications of the ACM., 32(4), pp. 444–458, April, 1989].

Conventional methods have failed to provide a uniform, flexible and robust underlying communication infrastructure for agent systems for communication between agents, between agents and agent-hosting servers, and between agent-hosting servers. Thus, there is a clearly felt need for a method of, system for, and computer program product for, providing a flexible and robust underlying communication infrastructure for agent systems for communication between agents, between agents and agent-hosting servers, and between agent-hosting servers.

SUMMARY OF THE INVENTION

A communication infrastructure providing communication between agents, between agents and agent-hosting servers, and between agent-hosting servers. The infrastructure meets technical requirements for flexibility and robustness: extensible types of messages, asynchronous and synchronous message passing, queuing, disconnected operation, inter-agent communication, and inter-agent-server communication. The communication infrastructure consists of three layers (from bottom to top): Mail Facility Layer, Message Facility Layer, and Agent Management Communication Facility Layer. The communication infrastructure has an open architecture in that a lower layer is designed to be more general than upper layers and can be used independent of the upper layers. Each upper layer, however, is designed to use and depends on the lower layers. The Mail Facility Layer is the lowest layer providing a general, semantics-free mail paradigm for asynchronous communication between distributed objects, whether they are local or remote to each other. The Mail Facility Layer provides a level of abstraction in terms of mail, virtual mailbox, post office, and mail queue, and hides the details of implementation and actual transport. It is designed to provide location transparency and to be implementable using various transport protocols. The next Message Facility Layer provides a typed messaging paradigm for asynchronous and synchronous message passing between distributed objects, whether they are local or remote to each other. The Message Facility Layer uses the Mail Facility Layer for sending messages and, where appropriate, for getting responses to requests sent. It allows for the association of typed message handlers with typed messages such that the format and semantics of messages are encapsulated through their types, are extensible, and can be processed by the associated message handlers. The Agent Management Communication Facility Layer is the highest layer providing the services for inter-agent communication between agents, agent-agent-server communication between an agent and an agent server, and inter-agent-server communication between agent servers for managing agents such as locating an agent, dispatching an agent, retrieving an agent, etc. The key abstractions provided in this layer include agent manager, agent, and agent identifier. It uses the Message Facility Layer and Mail Facility Layer to carry out the communication.

The present invention has the advantage of providing a flexible and robust underlying communication infrastructure for agent systems for communication between agents, between agents and agent-hosting servers, and between agent-hosting servers.

The present invention has the further advantage of providing extensible types of messages.

The present invention has the further advantage of providing asynchronous and synchronous message passing.

The present invention has the further advantage of providing queuing of message passing.

The present invention has the further advantage of providing disconnected operation for inter-agent communication and inter-agent-server communication.

The present invention has the further advantage of allowing implementations of various messaging paradigms to support distributed objects and agent mobility.

The present invention has the further advantage of allowing implementations of various abstractions to be easily be built on top of the Mail Facility Layer, and facilitating multiple protocol implementations through the Mail Facility Layer.

BRIEF DESCRIPTION OF THE DRAWINGS

For a more complete understanding of the present invention and the advantages thereof, reference is now made to the Description of the Preferred Embodiment in conjunction with the attached Drawings, in which.

DESCRIPTION OF THE PREFERRED EMBODIMENT

Figure 1:
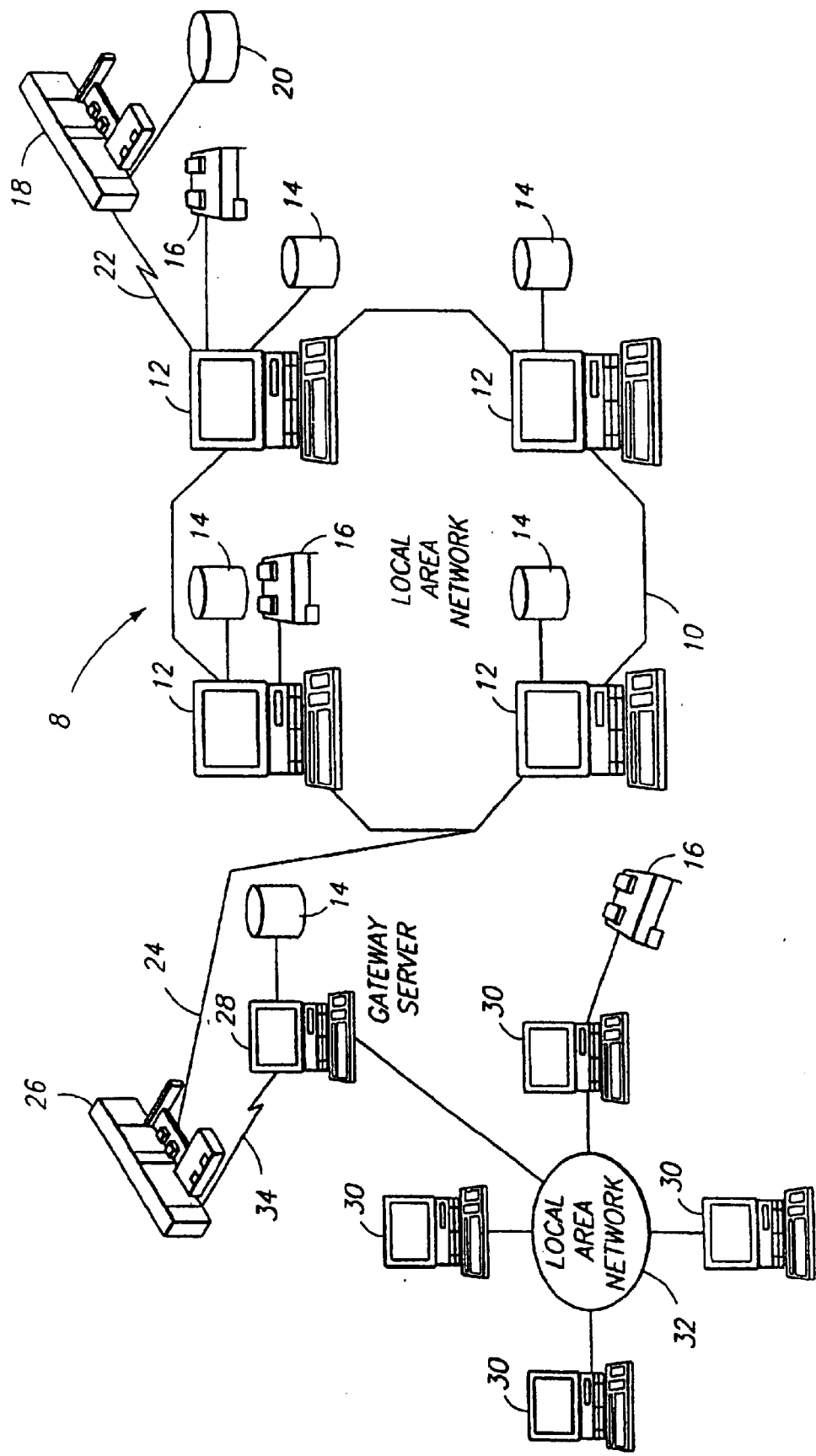
FIG. 1 is a block diagram of a distributed computer system used in performing the method of the present invention, forming part of the apparatus of the present invention, and which may use the article of manufacture comprising a computer-readable storage medium having a computer program embodied in said medium which may cause the computer system to practice the present invention.

With reference now to the figures and in particular with reference to FIG. 1, there is depicted a pictorial representation of a distributed computer system 8 which may be utilized to implement the method of, system for, and article of manufacture of the present invention. As may be seen, distributed computer system 8 may include a plurality of networks 10 and 32, which may be Local Area Networks (LAN), intranet networks, or internet networks, each of which preferably includes a plurality of individual computers 12 and 30, respectively. Of course, those skilled in the art will appreciate that a plurality of Intelligent Work Stations (IWS) coupled to a host processor may be utilized for each such network.

As is common in such data processing systems, each individual computer may be coupled to a storage device 14 and/or a printer/output device 16. One or more such storage devices 14 may be utilized, in accordance with the present invention, to store the various computer programs which may be accessed and executed by a user within the distributed computer system 8, in accordance with the present invention. In a manner well known in the prior art, each such computer program may be stored within a storage device 14.

Still referring to FIG. 1, it may be seen that distributed computer system 8 may also include multiple mainframe computers, such as mainframe computer 18, which may be preferably coupled to Local Area Network 10 by means of communication link 22. Mainframe computer 18 may also be coupled to a storage device 20 which may serve as remote storage for Local Area Network 10 which may be coupled via communications controller 26 and communications link 34 to a gateway server 28. Gateway server 28 is preferably an individual computer or Intelligent Work Station which serves to link Local Area Network 32 to Local Area Network 10.

As discussed above with respect to Local Area Network 32 and Local Area Network 10, a plurality of server computer programs may be stored within storage device 20 and executed by mainframe computer 18. Similarly, a plurality of client computer programs may be stored within storage devices 14 and executed by individual computers 12 such that distributed client/server computer programs are provided. Of course, those skilled in the art will appreciate that the mainframe computer 18 may be located a great geographical distance from Local Area Network 10, and similarly, Local Area Network 10 may be located a substantial distance from Local Area Network 32. That is, Local Area Network 32 may be located in California while Local Area Network 10 may be located within Texas and mainframe computer 18 may be located in New York.

As will be appreciated upon reference to the foregoing, it is often desirable for a user within one portion of distributed data processing system 8 to execute agent computer programs on one or more portions of data processing system 8. For example, the user may execute a client computer program on computer 12 which dispatches a mobile agent to execute on mainframe 18. After obtaining services or information from mainframe 18, the mobile agent may transfer to computer 30 to obtain further services or information from computer 30. Finally, the mobile agent may be retrieved from computer 30 back to computer 12.

System Architecture

The communication infrastructure consists of three layers (from bottom to top):

Mail Facility Layer 210;

Message Facility Layer 220; and

Agent Management Communication Facility Layer 230.

Figure 2:
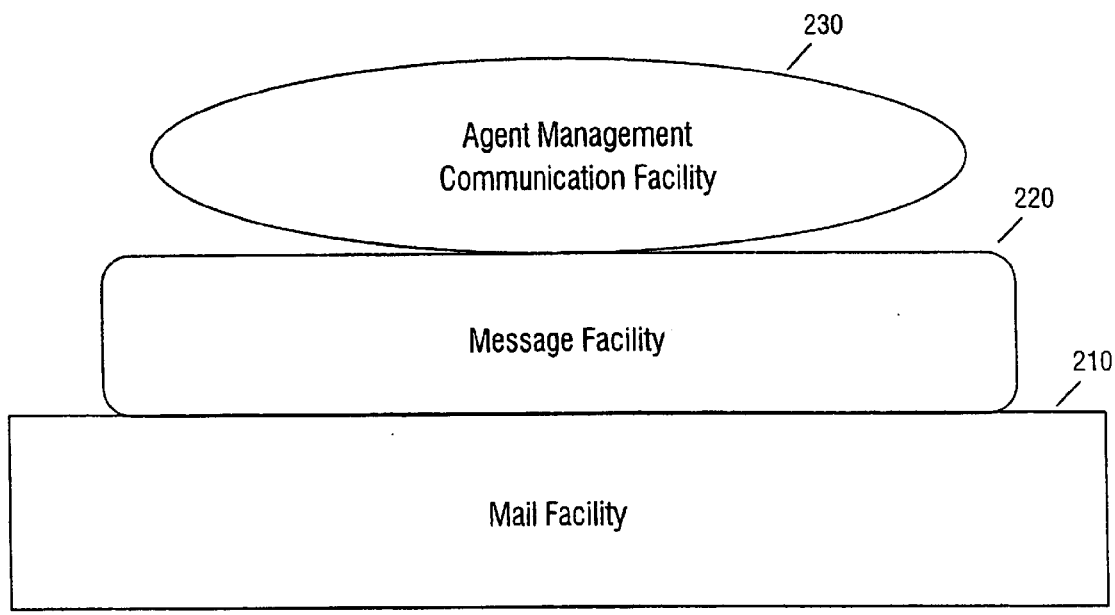
FIG. 2 is a block diagram of an agent communication infrastructure in accordance with the present invention.

The communication infrastructure has an open architecture in that a lower layer is designed to be more general than upper layers and can be used independent of the upper layers. Each upper layer, however, is designed to use and depends on the lower layers. FIG. 2 illustrates how the Agent Management Communication Facility Layer 230 uses and depends upon the lower Message Facility Layer 220 and Mail Facility Layer 210. FIG. 2 also illustrates how the Message Facility Layer 220 uses and depends upon the lower Mail Facility Layer 210. However, FIG. 2 also illustrates how the lower Message Facility Layer 220 and Mail Facility Layer 210 may be used independently of the upper Agent Management Communication Facility Layer 230, and how the lower Mail Facility Layer 210 may be used independently of the upper Message Facility Layer 220.

The Mail Facility Layer 210 is the lowest layer and the foundation of the communication infrastructure. It provides a general, semantics-free mail paradigm for asynchronous communication between distributed objects such as Java objects, whether they are local or remote to each other. The Mail Facility Layer 210 provides a level of abstraction in terms of mail, virtual mailbox, post office, and mail queue, and hides the details of implementation and actual transport. It is designed to provide location transparency and to be implementable using various transport protocols. Table 2 comprises a package index of the preferred embodiment of the present invention; Table 4 comprises class definitions of the mail package of the preferred embodiment of the present invention; Table 5 comprises class definitions of the mail implementation package of the preferred embodiment of the present invention; Table 8 comprises a class hierarchy of the preferred embodiment of the present invention; and Table 9 comprises an index of all fields and methods of the preferred embodiment of the present invention.

The next layer in the communication infrastructure is the Message Facility Layer 220. It provides a typed messaging paradigm for asynchronous and synchronous message passing between Java objects, whether they are local or remote to each other. The Message Facility Layer 220 uses the Mail Facility Layer 210 for sending messages and, where appropriate, for getting responses to requests sent. It allows for the association of typed message handlers with typed messages such that the format and semantics of messages are encapsulated through their types, are extensible, and can be processed by the associated message handlers. Table 6 comprises class definitions of the message package of the preferred embodiment of the present invention, and Table 7 comprises class definitions of the message handler package of the preferred embodiment of the present invention.

The Agent Management Communication Facility Layer 230 is the highest layer of the communication infrastructure. It provides the services for inter-agent communication between agents, agent-agent-server communication between an agent and an agent server, and inter-agent-server communication between agent servers for managing agents such as locating an agent, dispatching an agent, retracting an agent, etc. The key abstractions provided in this layer include agent manager, agent, and agent identifier. It uses the Message Facility Layer 220 and Mail Facility Layer 210 to carry out the communication. Table 3 comprises class definitions of the agent package of the preferred embodiment of the present invention.

Mail Facility

Figure 3:
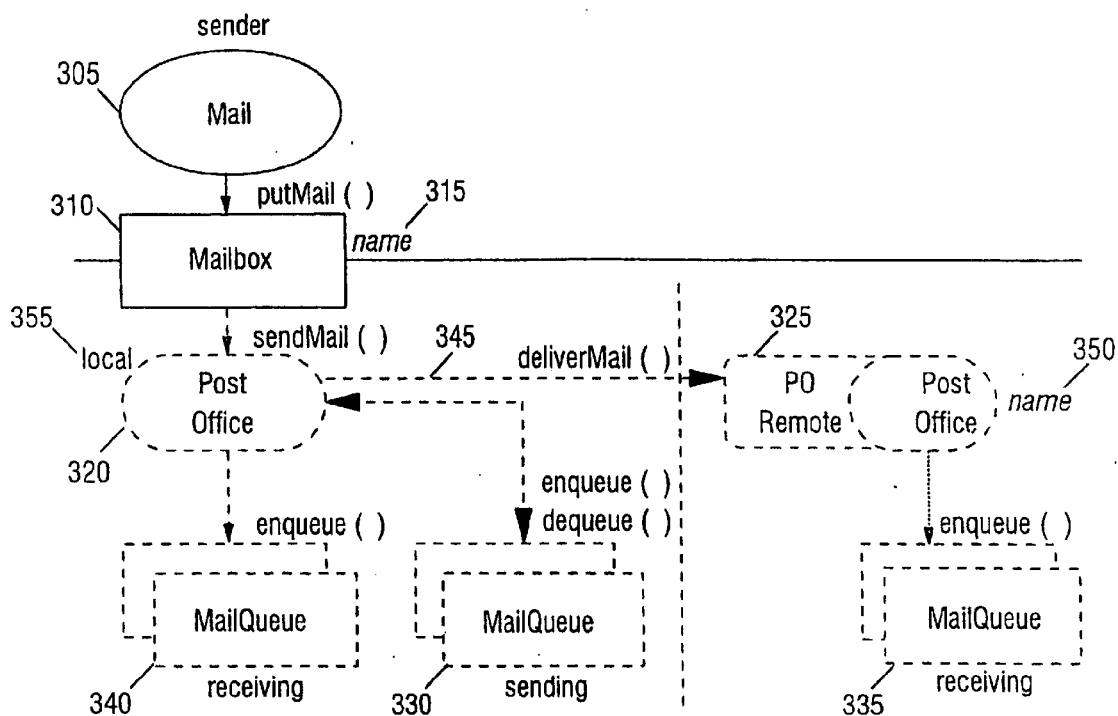
FIG. 3 illustrates sending a mail through a virtual mailbox using the Mail Facility Layer of the present invention.

The Mail Facility Layer 210 provides an asynchronous mail delivery service. Java objects, whether they are local or remote to each other, can use the facility to communicate with each other in an asynchronous manner. A key concept and innovation is that of the virtual mailbox. To send a mail 305, one needs to simply open a virtual mailbox 310 with the name 315 that represents the destination for the mail 305 and put the mail in the virtual mailbox 310. The Mail Facility Layer 210 will do the rest and deliver the mail 305 to the physical destination represented by the name 315, be it local or remote. This is shown in FIG. 3, where Mail 305, Mailbox 310, PostOffice 320, PORemote 325, and MailQueue 330 are Java classes or interfaces.

Figure 4:
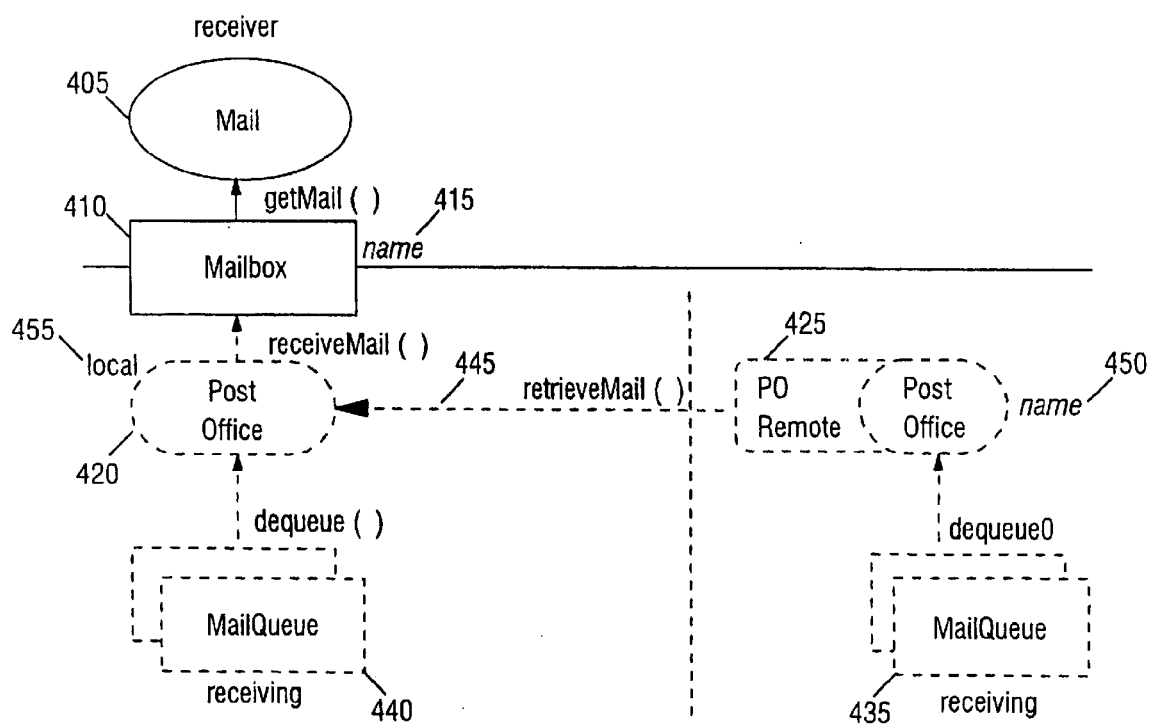
FIG. 4 illustrates receiving a mail through a virtual mailbox using the Mail Facility Layer of the present invention.

To receive a mail 405, one again needs to simply open a virtual mailbox 410 with the name 415 that represents the location for the mail and get the mail 405 from the virtual mailbox 410. The Mail Facility Layer 210 will do the rest and retrieve the mail 405 from the physical location represented by the name 415, be it local or remote, as illustrated in FIG. 4.

The Mail Facility Layer 210 uses the abstraction of post office (320, 325, 420, and 425) and mail queue (330, 335, 340, 435, and 440) to encapsulate and hide the details of implementation and actual transport. The post office can be implemented using various transport protocols (345 and 445) and can support multiple transport protocols at the same time. The mail queue (330, 335, 340, 435, and 440) provides the store and forward, and persistence capabilities to support asynchronous and disconnected operations.

Each mail (305 and 405) is designed to have an unique identifier, a correlation identifier, which can be used to correlate related mail, e.g., between responses and requests. To allow for content of various types to be sent and received by mail, each mail has a type specification which is extensible and which does not require name registration. An example of this is given in the discussion of the Message Facility Layer 220. A mail can be given a priority to facilitate its processing by the receiver.

As mentioned before, the virtual mailbox (310 and 410) provides location transparency when sending and receiving mail. Each virtual mailbox 310 is associated with a name 315 which represents some destination or location, local or remote. The name 315 ties it with a certain post office 325, which is the logical home of the virtual mailbox 310. When sending a mail 305, one simply puts it in a virtual mailbox 310 with the appropriate name 315. When receiving a mail 405, one gets it from a virtual mailbox 410 with the appropriate name 415. If needed, one can specify the type or correlation identifier of the mail to be received.

The post office (320, 325, 420, and 425) does the actual sending and receiving of mail. Each post office (320, 325, 420, and 425) is associated with a name (355, 350, 455, and 450 respectively) which represents its location and identification, and which may include the specification of the mail transport protocol (345, 445) (RMI, IIOP, or MQSeries, for example) to be used by the post office. If the protocol is not specified, the default protocol is implied. A mail 305 can be sent through any known local post office 320, which in turn will deliver the mail 305 to the appropriate destination post office 325. A mail 405 can be received through any known local post office 420, which in turn will retrieve the mail from the appropriate location post office 425, which is the physical location of the mail to be received. If needed, one can specify the type or correlation identifier of the mail to be received.

The post office 320 stores mail in mail queues (330 and 340). It maintains various receiving mail queues 340 for the virtual mailboxes that it owns. Additionally it maintains some sending mail queues 330 which allow it to handle disconnected operation and to optimize mail delivery. The quality of service provided by a mail queue depends on its implementation (e.g., in memory, using files, using databases).

From the above discussion it can be seen that the Mail Facility Layer 210 is a general purpose, asynchronous mail delivery service for Java objects. It forms a flexible and robust foundation for the communication infrastructure. It provides virtual mailboxes for one to send and receive mail in a location transparent manner. The mail can contain various types of content with extensible type specifications.

And it utilizes mail queues to provide store and forward, and persistence capabilities.

Message Facility

Figure 5:
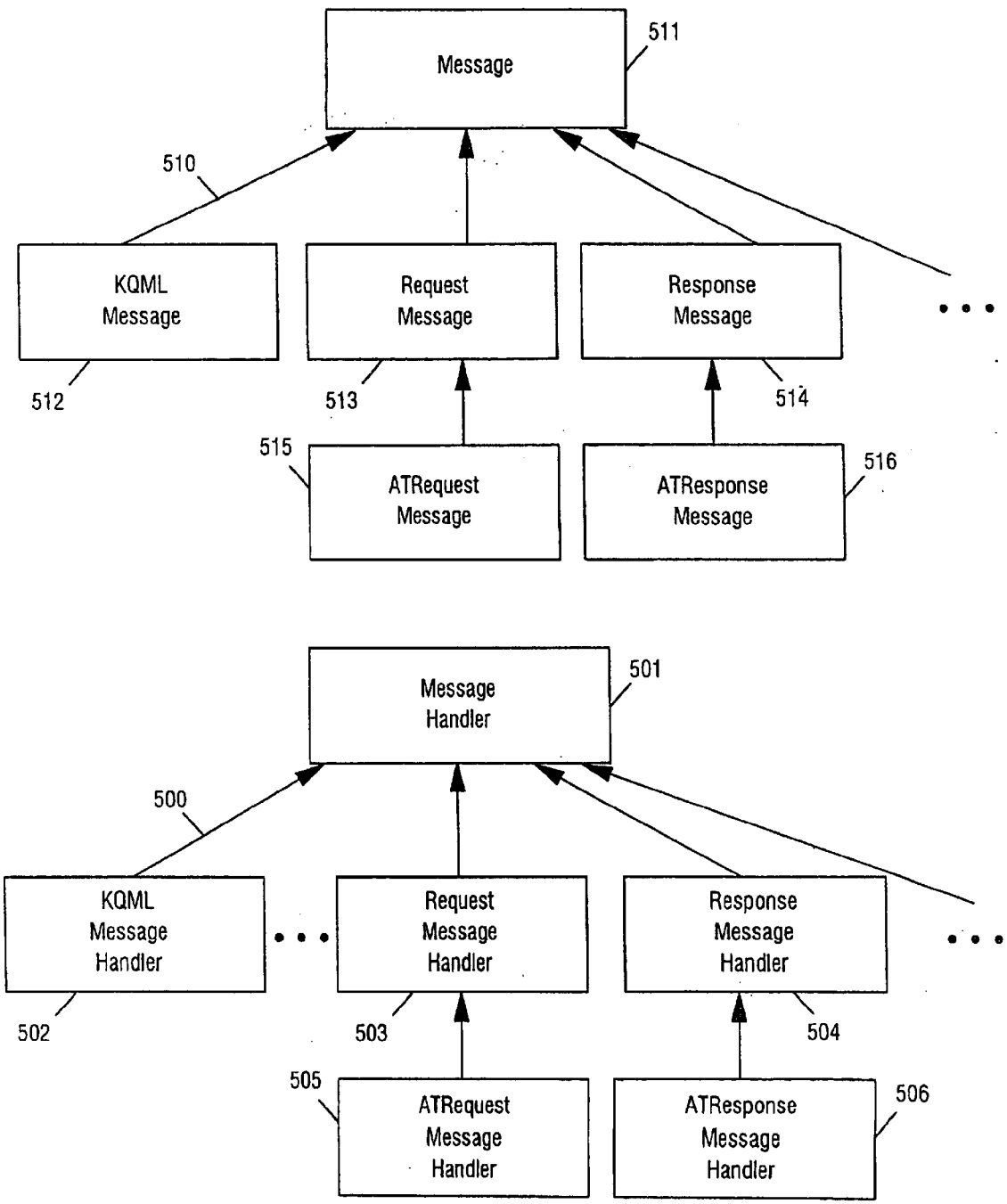
FIG. 5 illustrates a type hierarchy of messages and a type hierarchy of message handlers in accordance with the Message Facility Layer of the present invention.

The Message Facility Layer 220 provides a typed message paradigm for asynchronous and synchronous message passing between Java objects, whether they are local or remote to each other. It allows for the association of typed message handlers (501, 502, 503, 504, 505, and 506) with typed messages (511, 512, 513, 514, 515, and 516 respectively) such that the format and semantics of messages are encapsulated through their types and can be processed by the associated message handlers. As such, both messages and their associated message handlers can be easily extended and doing so without the need of a naming authority. The message type hierarchy 510 and the associated message handler type hierarchy 500 are illustrated in FIG. 5, where Message 511, MessageHandler 501, etc. are Java interfaces or classes, and arrows are used to indicate inheritance.

An important consideration in the design of the Message Facility Layer 220 is that, in general, agents need to communicate with each other using many different types of messages: event messages ["Concordia: An Infrastructure for Collaborating Mobile Agents", Mitsubishi Electric ITA, in First International Workshop on Mobile Agents 97 (MA '97), April, 1997; "Mobile Agent Computing", A White Paper, Mitsubishi Electric ITA, Feb. 28, 1997], KQML messages [InfoSleuth Project, URL=http://www.mcc.com/projects/infosleuth; JKQML, IBM, URL=http://objects.yamato.ibm.com/JKQML/index-e.html; Y. Labrou, "Semantics for an Agent Communication Language", Ph.D. thesis, CSEE department, University of Maryland, Baltimore Md. 21228-5398, September, 1996. URL=http://www.cs.umbc.edu/kqml], method invocation messages [The Common Object Request Broker: Architecture and Specification, Revision 2.0, OMG, July 1995], request/response messages [Aglets Workbench, IBM, URL=http://www.trl.ibm.co.jp/aglets], etc. A similar consideration is that agent-hosting servers also need to communicate with each other using many different types of messages in order to manage agents: agent transfer messages [Aglets Workbench, IBM, URL=http://www.trl.ibm.co.jp/aglets], agent query messages, statistics gathering messages, etc. Therefore, a key requirement in the design of the Message Facility Layer 220 is that it must support multiple types of messages and message handlers, and that it must support their extension and identification with ease. These are accomplished through the use of Java interface/class hierarchies and design patterns.

The Message Facility Layer 220 allows for asynchronous and synchronous message passing. Certain types of messages, such as event messages and KQML messages, are asynchronous in nature and are sent one-way. Other messages, such as method invocation messages and agent transfer messages, involve responses and can be sent in one of three different modes: synchronous (waiting for responses) 2400 of FIG. 24, deferred (getting responses at a later time) 2300 of FIG. 23, or one-way (asynchronous, discarding the responses) 2200 of FIG. 22.

A key design decision and innovation is to integrate the allowed message passing mode with the type of messages rather than treat it as orthogonal to the type of messages. This is based on the observation that for messages such as event messages or KQML messages, it does not make sense to send them in a synchronous or deferred mode. This also allows message definers the freedom to choose the appropriate mode(s) for their types of messages. Table 1 shows exemplary message types in accordance with the preferred embodiment of the present invention.

TABLE 1

| Message Type | Mode | | |
| --- | --- | --- | --- |
| | Asynchronous One-Way | Synchronous | Deferred |
| Event | X | | |
| KQML | X | | |
| Request/Response | X | X | X |
| Agent Transfer | | X | X |

Figure 6:
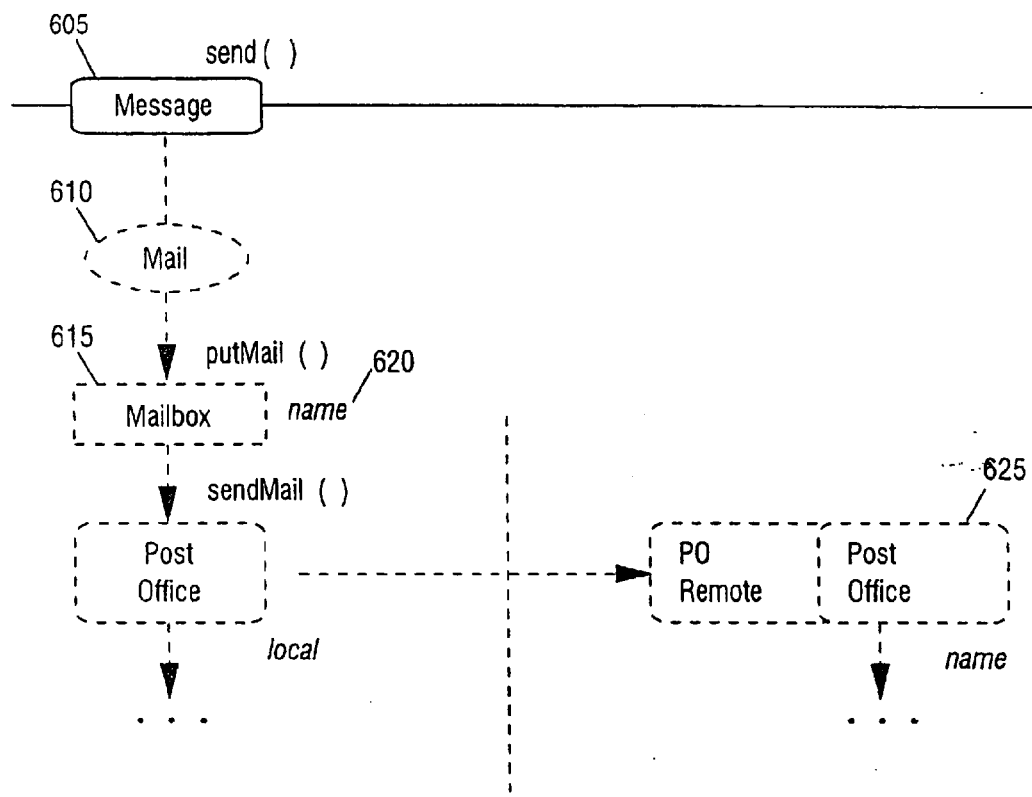
FIG. 6 illustrates sending and receiving of a message using the Message Facility Layer of the present invention.
Figure 6:
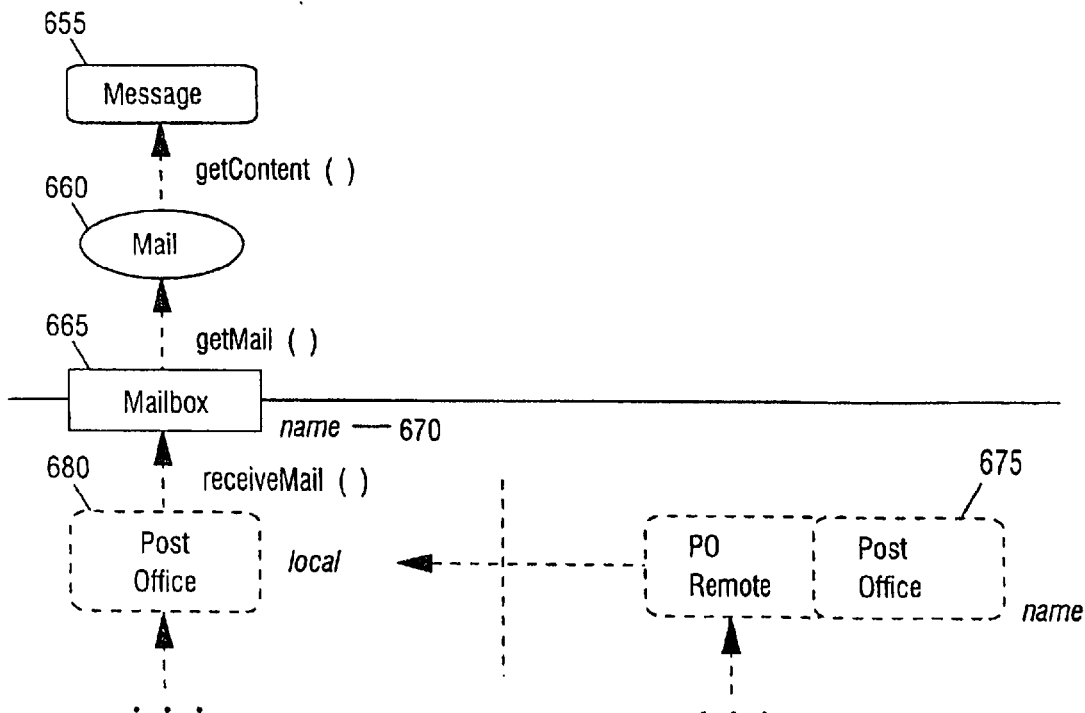

To send a message 605 of FIG. 6 via the Message Facility Layer 220, a user first creates a message 605 and then calls send( ) which creates a mail 610 specifying the type of content and the content wherein the type of content is the type of the message and the content is the message 605. The message 605 also creates a virtual mailbox 615 specifying the virtual mailbox name 620 that represents the destination for the mail 625, which is the receiver virtual mailbox of the message 605. Thereafter, the message 605 puts the mail 610 in the virtual mailbox 615 which causes the Mail Facility Layer 210 to deliver the message 605 to the destination 625.

To receive a message via the Message Facility Layer 220, a user creates a virtual mailbox 665 specifying the virtual mailbox name 670 that represents the physical location 675 of the mail. The user then gets the mail 660, whose content is the message 655, from the virtual mailbox 665 which causes the Mail Facility Layer 210 to get the mail 660 from the location post office 675 through the local main post office 680 into the virtual mailbox 665.

In summary, the Message Facility Layer 220 is a general purpose, message passing service for Java objects and uses the Mail Facility Layer 210 for actual message delivery. It serves as a flexible middle layer for the communication infrastructure. It provides an extensible framework for handling typed messages and associated handlers, and it allows for message passing, where appropriate, in asynchronous, synchronous, or deferred mode.

Agent Management Communication Facility

The Agent Management Communication Facility Layer 230 is the highest layer of the communication infrastructure. It is designed to provide a uniform scheme for handling inter-agent communication, whether the agents involved are stationary or mobile, and inter-agent-server communication. It uses the Message Facility Layer 220 and Mail Facility Layer 210 to carry out the communication.

Figure 7:
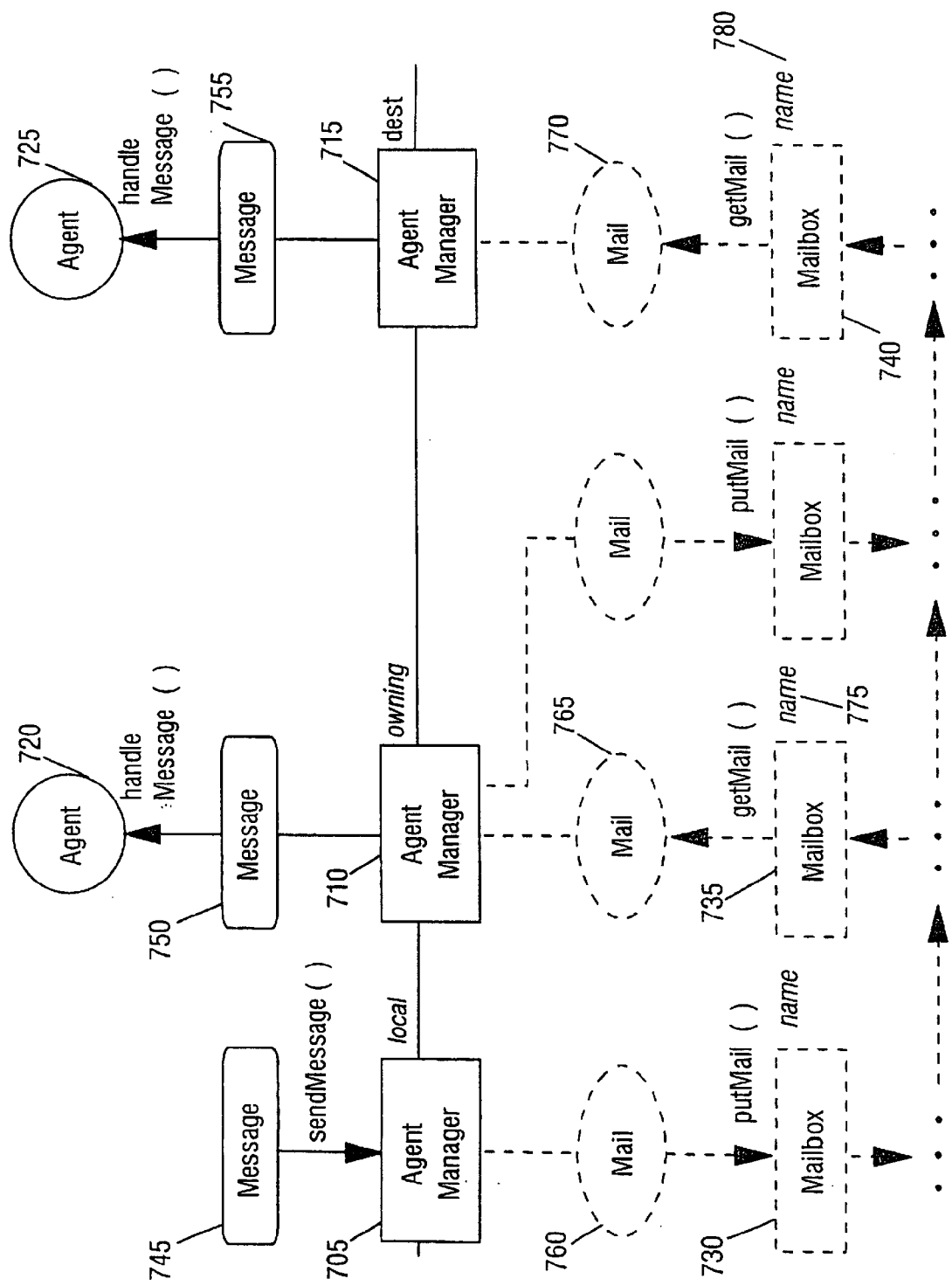
FIG. 7 illustrates agent communication in accordance with the Agent Management Communication Facility Layer of the present invention.
Figure 8:
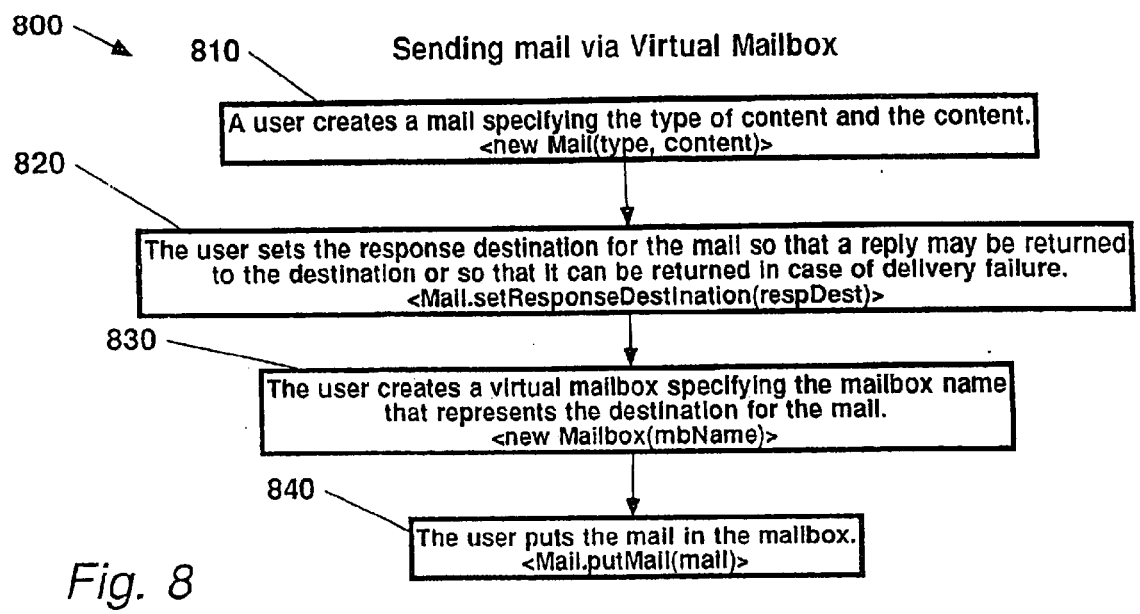
FIG. 8 is a flowchart illustrating the operations preferred in carrying out the send mail portion of the present invention.

A key abstraction provided is that of an agent manager (705, 710, and 715). An agent manager manages a group of agents, stationary or mobile, and is responsible for working with other agent managers to locate an agent, send a message to an agent, dispatch an agent, retrieve an agent, etc. Each agent is autonomous and has an agent identifier which uniquely identifies it regardless whether it moves or not. The message passing between agents is illustrated in FIG. 7, where AgentManager (705, 710, and 715) and Agent (720 and 725) are Java classes.

Inter-agent Communication

Communication between mobile agents is done through the collaboration of agent managers. A mobile agent's owning agent manager is aware of an agent's whereabouts at all times and can cause appropriate message forwarding to the current location of an agent. A local agent manager manages agents located at the local agent manager's location or system. If there are one or more local agent managers at a location, then a local main agent manager is the default agent manager. If a mobile agent moves to a location other than that of its owning agent manager, then the managing agent manager at that current location of the agent is known as a destination agent manager.

Each agent manager (705, 710, and 715) owns one or more virtual mailboxes (730, 735, 740, and 790) and uses them to exchange messages (745, 750, and 755) via mail (760, 765, 770, and 785). For example, if an agent manager 705 is asked to send a message 745 to an agent 720, it will generate a mail 760 (with the message 745 encapsulated as its content) and put in the owning agent manager's virtual mailbox 730. The owning agent manager 710 then will, at an appropriate time, receive the message 750, thus causing a mail 765 to be retrieved from its virtual mailbox 735. If the agent 720 is owned and managed by owning agent manager 710, then the owning agent manager 710 will locate the agent 720 and request the agent 720 to handle the message 750.

If the agent 725 is owned, but not managed by, agent manager 710, then the message needs to be redirected to the managing destination agent manager 715. In this situation, owning agent manager 710 generates a mail 785 (with the message 750 encapsulated as its content) and puts the mail 785 in the destination agent manager's 715 virtual mailbox 790. The destination agent manager 715 then will, at an appropriate time, receive the message 755, thus causing a mail 770 to be retrieved from its virtual mailbox 740. The destination agent manager 715 will then locate the agent 725 and request the agent 725 to handle the message 755.

From the above discussion it can be seen that the present invention provides a uniform facility for communication between agents, whether they are stationary or mobile, and for communication between agent managers for the purpose of managing agents, e.g., transferring an agent to a new location.

Referring next to FIG. 8 through FIG. 28, flowcharts illustrating operations preferred in carrying out the present invention are shown. In the flowcharts, the graphical conventions of a diamond for a test or decision and a rectangle for a process or function are used. These conventions are well understood by those skilled in the art, and the flowcharts are sufficient to enable one of ordinary skill to write code in any suitable computer programming language.

Mail Facility Layer Preferred Embodiment

Referring first to FIG. 8 through FIG. 15, the operations preferred in carrying out the Mail Facility Layer 210 of the present invention are illustrated. FIG. 8 through FIG. 11 illustrate the operations preferred in sending mail, and FIG. 12 through FIG. 15 illustrate the operations preferred in receiving mail. To send mail, a user creates a mail 305 specifying the type of content and the content by use of API (Application Program Interface) <new Mail(type, content)> (process block 810 of FIG. 8). The user may also set a response destination for the mail 305 so that a reply may be returned to that destination or so that the mail 305 can be returned in case of delivery failure, <Mail.setResponseDestination(respDest)> (process block 820). The user then creates a virtual destination mailbox 310 by specifying a virtual mailbox name 315 that represents a destination for the mail 325, <new Mailbox(mbName)> (process block 830). The virtual mailbox name 315 comprises a post office name 350 and a mailbox id. The post office name 350 comprises a protocol, host, port, and post office id. This supports multiple protocols (e.g., RMI, which is the default), and the protocol determines the type of post office to be used for sending/receiving mail (e.g., an RMI post office is used in process block 920). Thereafter, the user puts the mail 305 in the virtual mailbox 310, <Mail.putMail(mail)> (process block 840).

Figure 9:
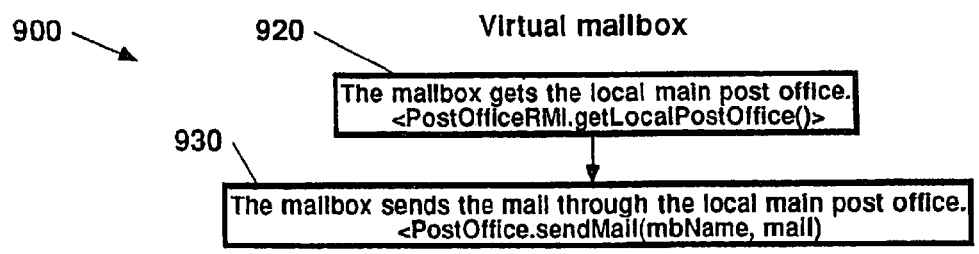
FIG. 9 is a flowchart illustrating the operations preferred in carrying out the virtual mailbox portion of the present invention when sending mail.

Referring next to FIG. 9, the operations preferred in carrying out the virtual mailbox (310 and 900) portion of the Mail Facility Layer 210 of the present invention are illustrated. After the mail 305 has been put into the virtual mailbox 310 by process block 840, process block 920 of FIG. 9 causes the virtual mailbox 310 to get the local main post office 320, <PostOfficeRMI.getLocalPostOffice( )>, and process block 930 sends the mail 305 through the local main post office 320, <PostOffice.sendMail(mbName, mail)>.

Figure 10:
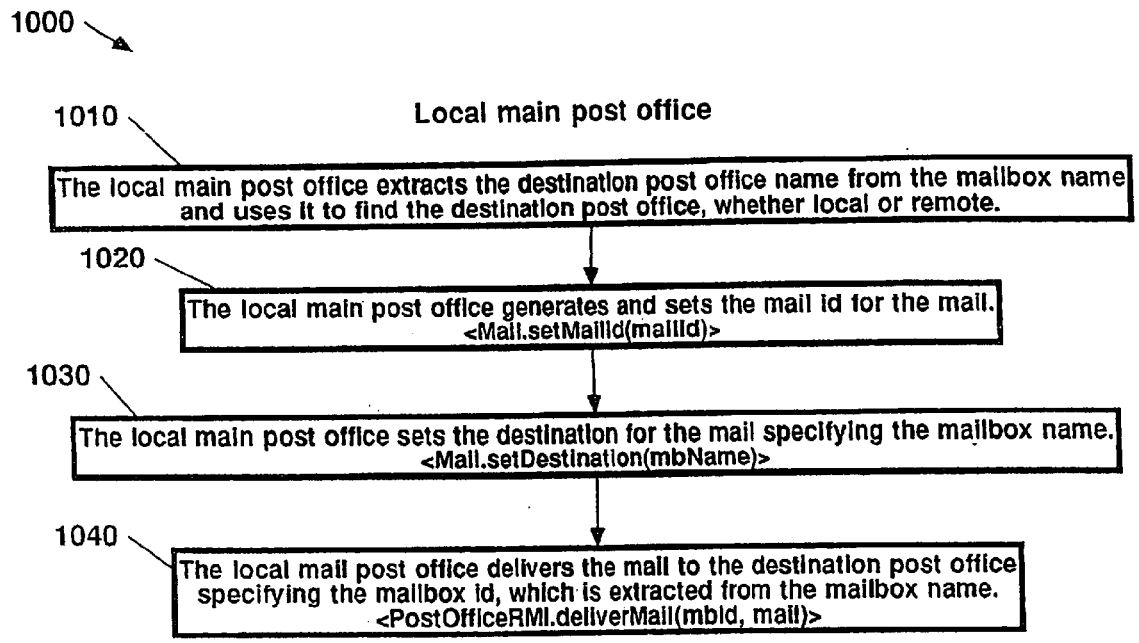
FIG. 10 is a flowchart illustrating the operations preferred in carrying out the local main post office portion of the present invention when sending mail.

Referring now to FIG. 10, the operations preferred in carrying out the local main post office (320 and 1000) portion of the Mail Facility Layer 210 of the present invention are illustrated. The local main post office 320 extracts the destination post office name 350 from the virtual mailbox name 315 and uses it to find the destination post office 325, whether local or remote (process block 1010). If the destination post office is not available, then the local main post office 320 may put the mail 305 in the sending mail queue 330 and repeat this step later. This supports disconnected operation. Thereafter, the local main post office 320 generates and sets the mail id for the mail, <Mail.setMailId(mailId)> (process block 1020), and sets the destination for the mail specifying the virtual mailbox name 315, <Mail.setDestination(mbName)> (process block 1030). Process block 1040 then causes the local main post office 320 to deliver the mail 305 to the destination post office 325 specifying the mailbox id, which is extracted from the virtual mailbox name, <PostOfficeRMI.deliverMail(mbId, mail)>.

Figure 11:
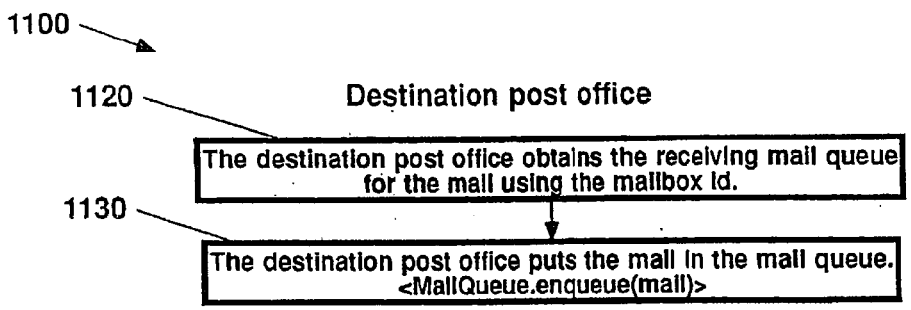
FIG. 11 is a flowchart illustrating the operations preferred in carrying out the destination post office portion of the present invention.

Referring now to FIG. 11, the operations preferred in carrying out the destination post office (325 and 1100) portion of the Mail Facility Layer 210 of the present invention are illustrated. After the mail 305 is received at the destination post office 325, the destination post office 325 obtains the receiving mail queue 335 for the mail 305 using the mailbox id (process block 1120), and then the destination post office 325 puts the mail 305 in the mail queue 335, <MailQueue.enqueue(mail)> (process block 1130). Different types of mail queues may provide different quality of service. For example, in-memory mail queue <MemMailQueue> provides fast access, whereas database mail queue <SQLMailQueue> provides persistent storage of mail. The use of these is determined by the post office and is transparent to the user.

Figure 12:
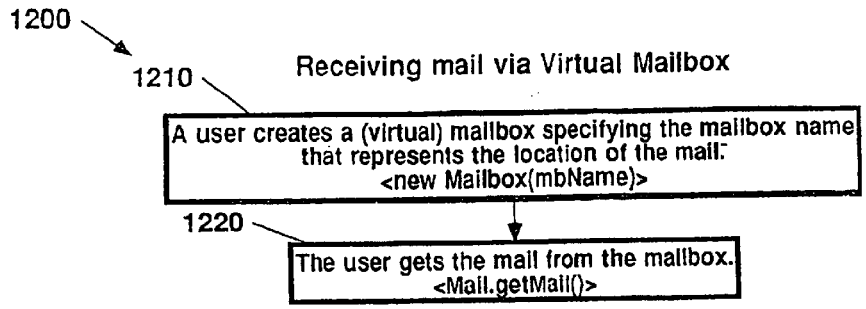
FIG. 12 is a flowchart illustrating the operations preferred in carrying out the receive mail portion of the present invention.

Referring now to FIG. 12 through FIG. 15, the operations preferred in receiving mail are illustrated. Referring first to FIG. 12, the user operations preferred in receiving mail via a virtual mailbox 410 are illustrated. A user creates a virtual mailbox 410 specifying the virtual mailbox name 415 that represents the physical location of the mail located at post office 425, <new Mailbox(mbName)> (process block 1210). Thereafter, the user gets the mail 405 from the virtual mailbox 410, <Mail.getMail( )> (process block 1220). Alternatively, the user may get the mail with a specific type of content or a specific correlation identifier. The correlation identifier or correlation id associates two or more pieces of mail, for example a mail object and a reply to that mail object.

Figure 13:
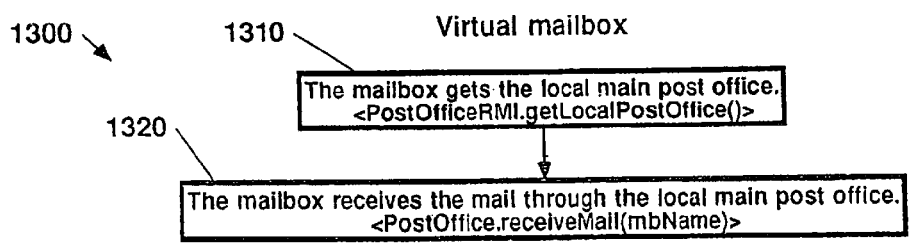
FIG. 13 is a flowchart illustrating the operations preferred in carrying out the virtual mail box portion of the present invention when receiving mail.

Referring next to FIG. 13, the operations preferred in the virtual mailbox 410 when receiving mail are illustrated. In response to the user getting the mail 405 from the virtual mailbox 410 (process block 1220), the virtual mailbox 410 gets the local main post office 420, <PostOfficeRMI.getLocalPostOffice( )> (process block 1310), and thereafter the virtual mailbox 410 receives the mail 405 through the local main post office 420, <PostOffice.receiveMail(mbName)> (process block 1320). Alternatively, the virtual mailbox may receive the mail with a specific type of content or a specific correlation id.

Figure 14:
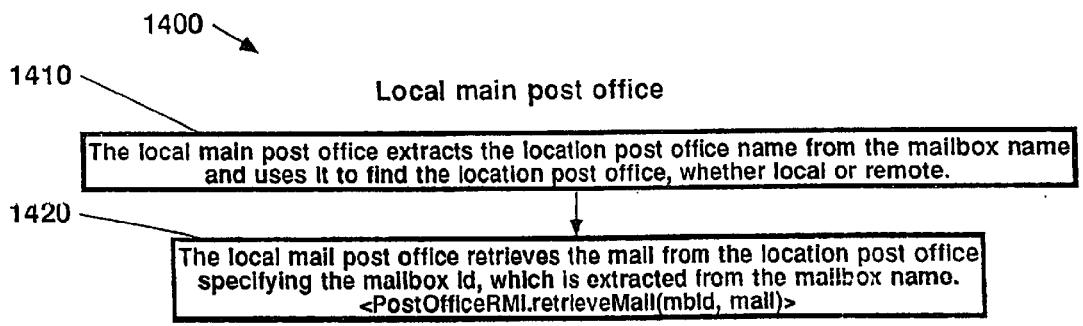
FIG. 14 is a flowchart illustrating the operations preferred in carrying out the local main post office portion of the present invention when receiving mail.

Referring next to FIG. 14, the operations preferred in the local main post office 420 when receiving mail are illustrated. In response to the virtual mailbox 410 getting the local main post office 420 (process block 1320), the local main post office 420 extracts the location post office name 450 from the virtual mailbox name 415 and uses it to find the location post office 425, whether local or remote (process block 1410). The location post office is the physical location of the mail to be received. If the location post office 425 is not available, the local main post office 420 will repeat process block 1410 later, thus supporting disconnected operation. Thereafter, the local mail post office 420 retrieves the mail 405 from the location post office 425 specifying the mailbox id, which is extracted from the virtual mailbox name 415, <PostOfficeRMI.retrieveMail(mbId, mail)> (process block 1420).

Figure 15:
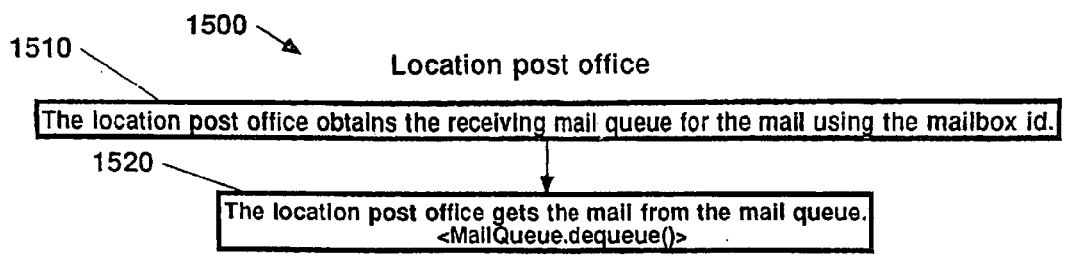
FIG. 15 is a flowchart illustrating the operations preferred in carrying out the location post office portion of the present invention.

Referring next to FIG. 15, the operations preferred in the location post office 425 when receiving mail are illustrated. In response to the local mail post office 420 retrieving the 12r mail 405 from the location post office 425 (process block 1420), the location post office 425 obtains the receiving mail queue 435 for the mail 405 using the mailbox id (process block 1510), 141 and then gets the mail 405 from the mail queue 435, <MailQueue.dequeue( )> (process block 1520). Alternatively, the location post office 425 may get the mail with a specific type of content or a specific correlation id. The mail obtained by process block 1520 is returned to process block 1420 which causes the mail to be returned to process block 1320 which causes the mail to be returned to process block 1220.

Message Facility Layer Preferred Embodiment

Figure 16:
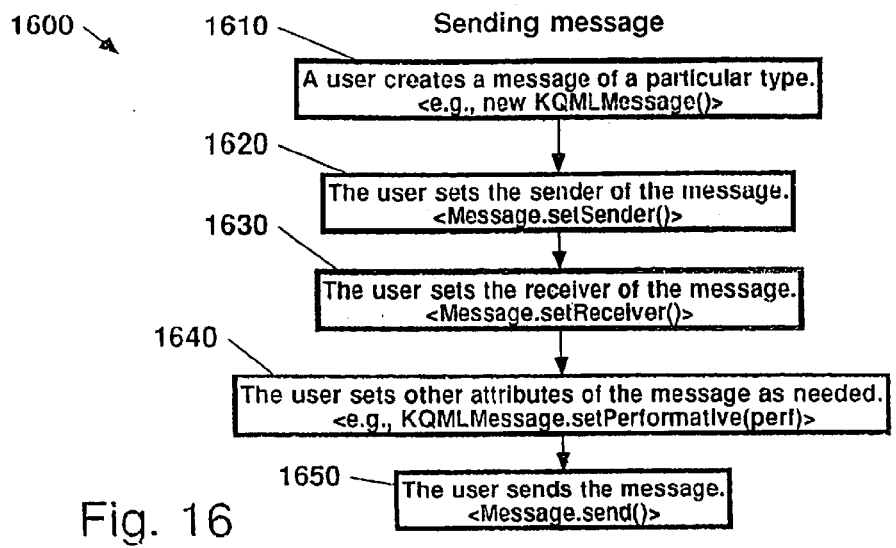
FIG. 16 is a flowchart illustrating the operations preferred in carrying out the send message portion of the present invention.
Figure 17:
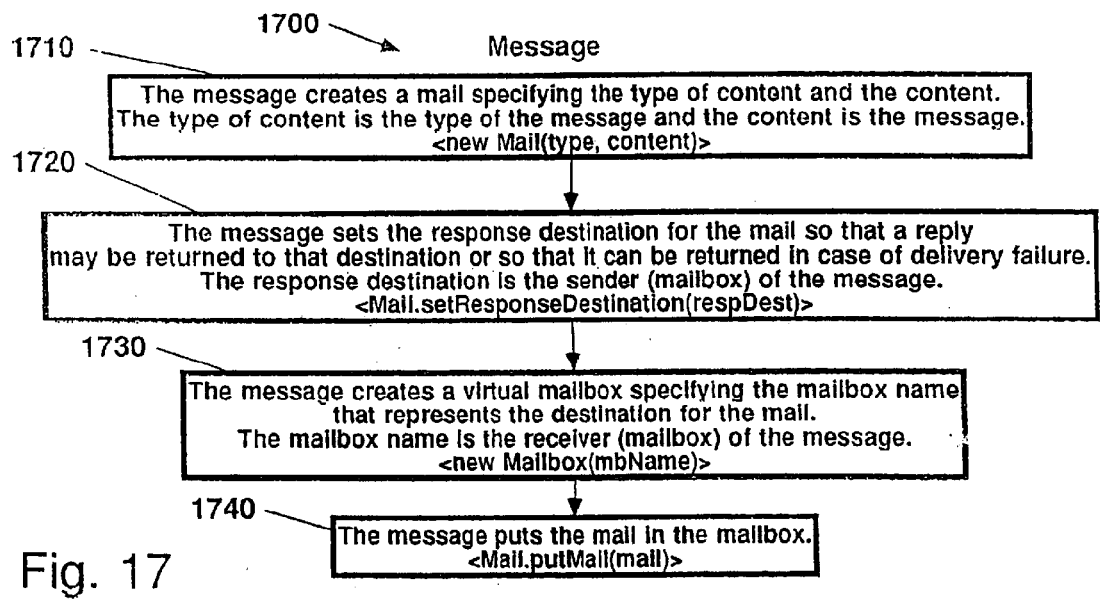
FIG. 17 is a flowchart illustrating the operations preferred in carrying out the message portion of the present invention.
Figure 18:
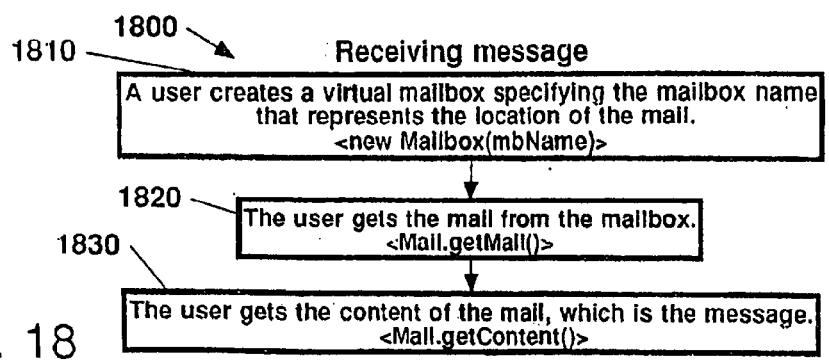
FIG. 18 is a flowchart illustrating the operations preferred in carrying out the receive message portion of the present invention.

Referring now to FIG. 16 through FIG. 18, the operations preferred in carrying out the Message Facility Layer 220 of the present invention are illustrated. FIG. 16 illustrates sending a message, FIG. 17 illustrates the sending of a message via the Mail Facility Layer 210, and FIG. 18 illustrates the receiving of a message.

Referring first to FIG. 16 illustrating the operations preferred in sending a message, a user creates a message 605 of a particular type, <e.g., new KQMLMessage( )> (process block 1610). The user sets the sender of the message, <Message.setSender( )> (process block 1620); sets the receiver of the message, <Message.setReceiver( )> (process block 1630), and sets other attributes of the message as needed, <e.g., KQMLMessage.setPerformative(perf)> (process block 1640). The user then sends the message, <Message.send( )> (process block 1650).

Referring next to FIG. 17 illustrating the operations preferred in the sending of a message 605 via the Mail Facility Layer 210, the message 605 creates a mail 610 specifying the type of content and the content wherein the type of content is the type of the message and the content is the message 605, <new Mail(type, content)> (process block 1710). The message 605 may also set a response destination for the mail 610 so that a reply may be returned to the destination or so that it can be returned in case of delivery failure, <Mail.setResponseDestination(respDest)> (process block 1720). The response destination is the sender virtual mailbox of the message. The message 605 also creates a virtual mailbox 615 specifying the virtual mailbox name 620 that represents the destination for the mail 625, <new Mailbox(mbName)> (process block 1730), which is the receiver virtual mailbox of the message 605. Thereafter, the message 605 puts the mail 610 in the virtual mailbox 615, <Mail.putMail(mail)> (process block 1740), which invokes the Virtual Mailbox processing 900 of the Mail Facility Layer 210 starting with process block 920 of FIG. 9 wherein the message 605 is the user of the Mail Facility Layer 210.

Referring next to FIG. 18 illustrating the operations preferred in the receiving of a message via the Message Facility Layer 220, a user creates a virtual mailbox 665 specifying the virtual mailbox name 670 that represents the physical location 675 of the mail, <new Mailbox(mbName)> (process block 1810). The user then gets the mail 660 from the virtual mailbox 665, <Mail.getMail( )> (process block 1820), which invokes the Virtual Mailbox processing 1300 of the Mail Facility Layer 210 starting with process block 1310 of FIG. 13 wherein the message 655 is the user of the Mail Facility Layer 210. After process block 1320 has received the mail 660 into the virtual mailbox 665 from the local main post office 680, the user gets the content of the mail 660, which is the message 655, <Mail.getContent( )> (process block 1830). Alternatively, process block 1820 may allow the user to optionally get the mail with a specific type of content which represents the type of message to be received.

Request/Response Messaging Preferred Embodiment

Figure 19:
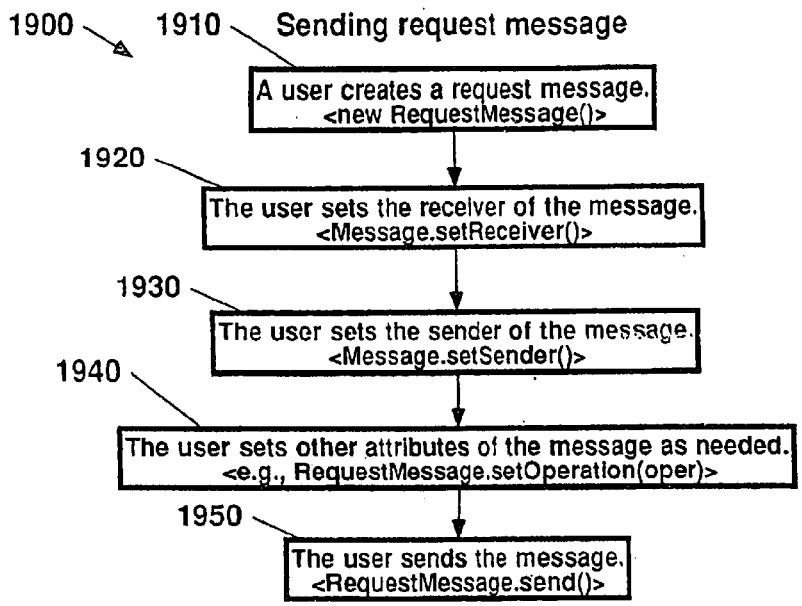
FIG. 19 is a flowchart illustrating the operations preferred in carrying out the Request/Response Messaging portion of the present invention when sending a request message.
Figure 20:
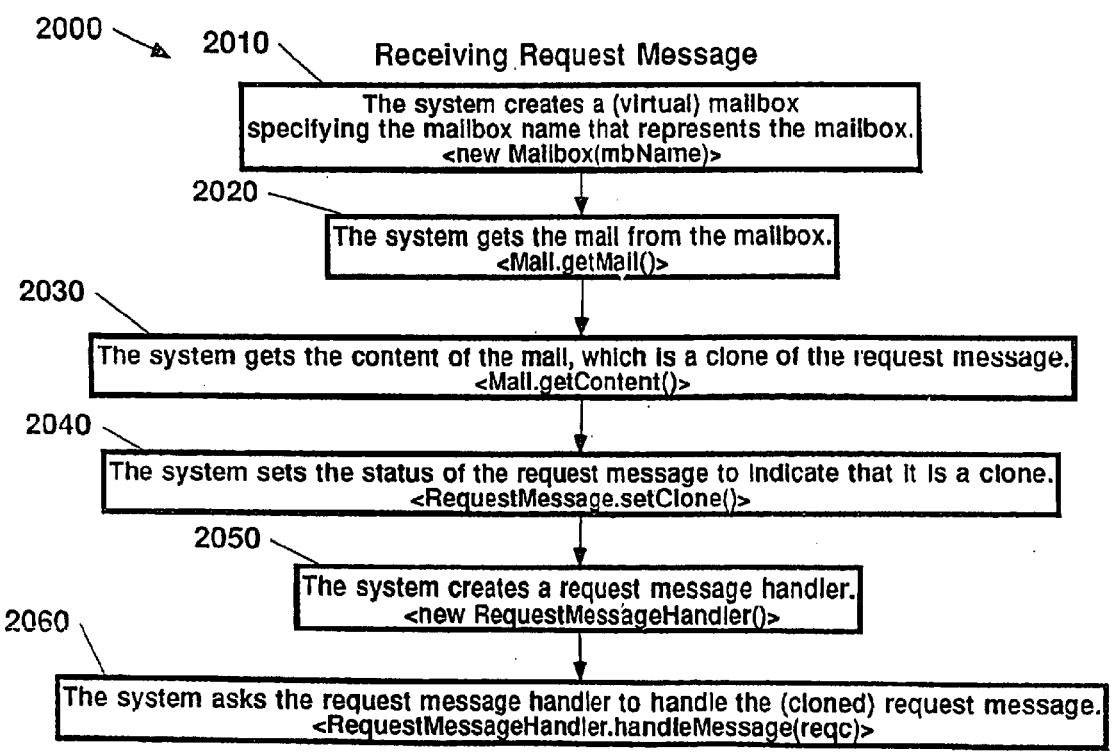
FIG. 20 is a flowchart illustrating the operations preferred in carrying out the Request/Response Messaging portion of the present invention when receiving a request message.
Figure 21:
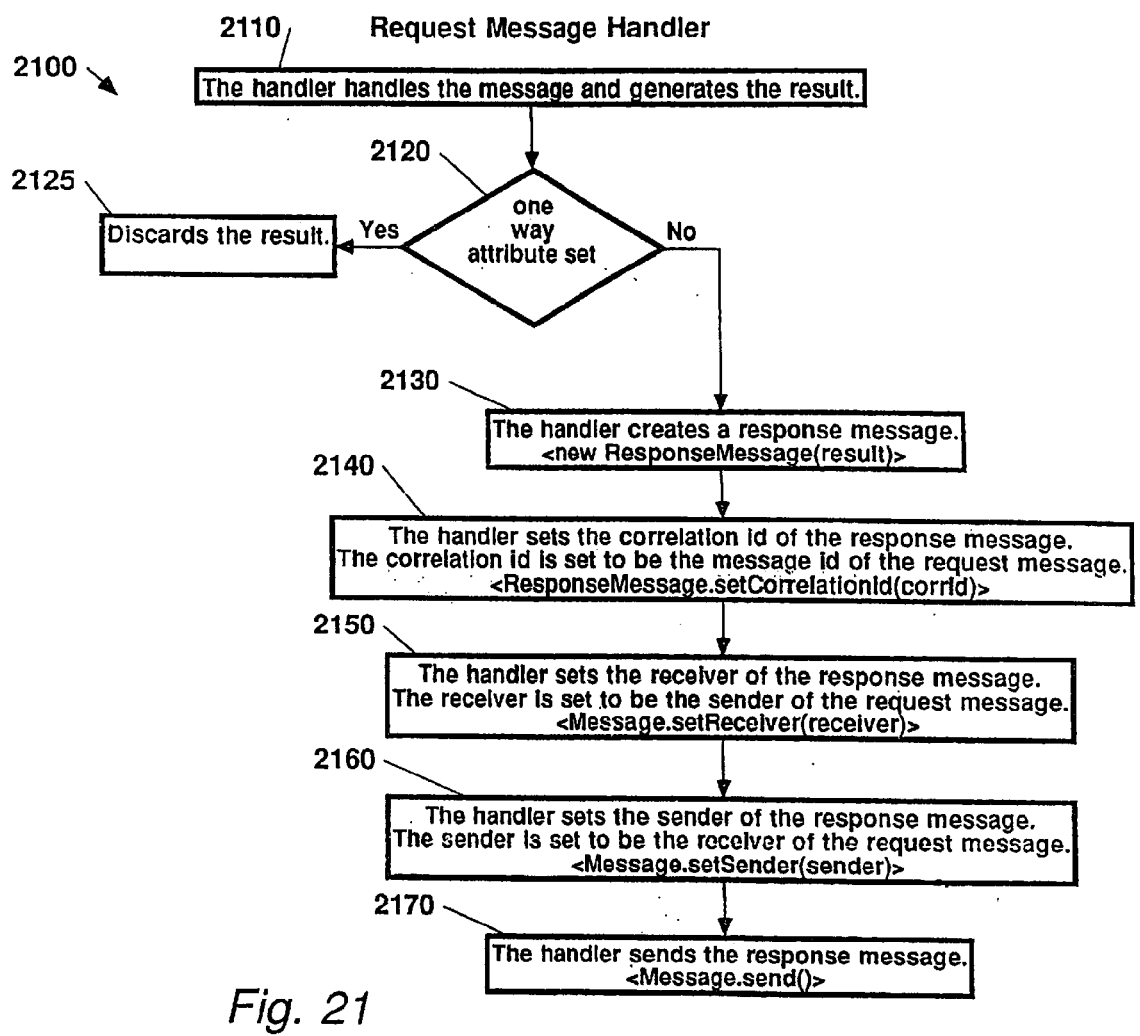
FIG. 21 is a flowchart illustrating the operations preferred in carrying out the Request/Response Messaging portion of the present invention when handling a request message.
Figure 22:
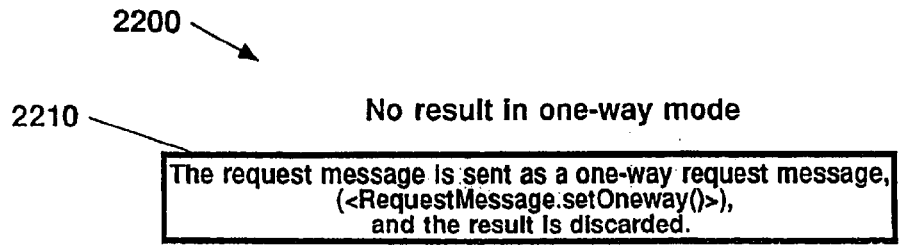
FIG. 22 is a flowchart illustrating the operations preferred in carrying out the one-way mode of the Request/Response Messaging portion of the present invention.
Figure 23:
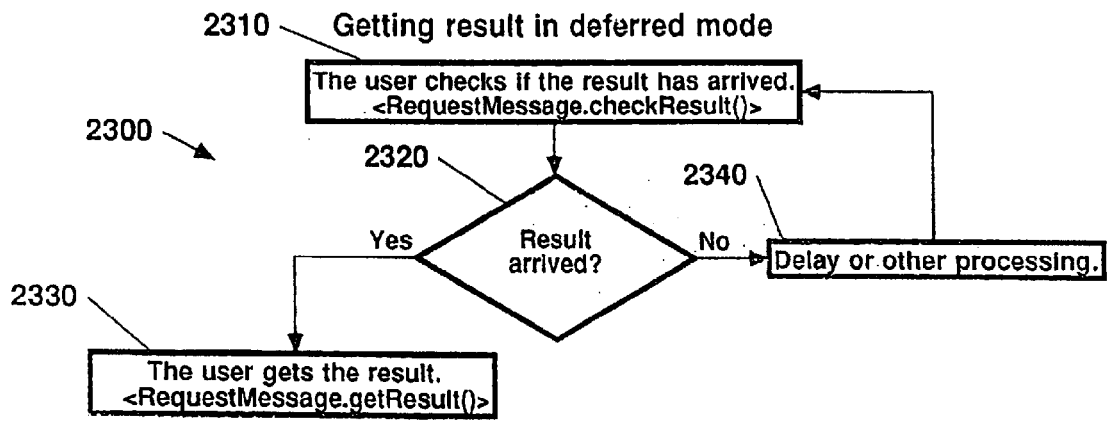
FIG. 23 is a flowchart illustrating the operations preferred in carrying out the deferred mode of the Request/Response Messaging portion of the present invention.
Figure 24:
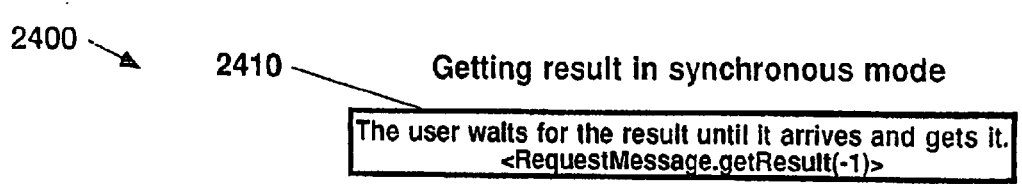
FIG. 24 is a flowchart illustrating the operations preferred in carrying out the synchronous mode of the Request/Response Messaging portion of the present invention.

Referring next to FIG. 19 through FIG. 24, the operations preferred in carrying out the Request/Response Messaging of the present invention are illustrated. FIG. 19 illustrates the operations preferred in sending a request message; FIG. 20 illustrates the operations preferred in receiving a request message; FIG. 21 illustrates the operations preferred in carrying out the Request Message Handler; FIG. 22 illustrates the operations preferred in a one-way mode of Request/Response Messaging; FIG. 23 illustrates the operations preferred in a deferred mode of Request/Response Messaging; and FIG. 24 illustrates the operations preferred in a synchronous mode of Request/Response Messaging.

Referring next to FIG. 19 illustrating the operations preferred in the sending of a request message, a user first creates a request message, <new RequestMessage( )> (process block 1910). The user sets the receiver of the message, <Message.setReceiver( )> (process block 1920); the sender of the message, <Message.setSender( )> (process block 1930); and other attributes of the message as needed, <e.g., RequestMessage.setOperation(oper)> (process block 1940). Thereafter, the user sends the message, <RequestMessage.send( )> (process block 1950) which invokes process block 1650 of FIG. 16 and processing continues by the Message Facility Layer 220.

Referring next to FIG. 20 illustrating the operations preferred in the receiving of a request message, the system (e.g., an agent manager) first creates a virtual mailbox specifying the virtual mailbox name that represents the virtual mailbox, <new Mailbox(mbName)> (process block 2010). The system then gets the mail from the virtual mailbox, <Mail.getMail( )> (process block 2020), using the virtual mailbox processing 1300 of FIG. 13, and the content of the mail, which is a clone of the request message, <Mail.getContent( )> (process block 2030). Thereafter, the system sets the status of the request message to indicate that it is a clone, <RequestMessage.setClone( )> (process block 2040). The system then creates a request message handler, <new RequestMessageHandler( )> (process block 2050), and the system asks the request message handler to handle the (cloned) request message, <RequestMessageHandler.handleMessage(reqc)> (process block 2060).

Referring next to FIG. 21 illustrating the operations preferred in the carrying out of the Request Message Handler, the handler handles the message and generates a result (process block 2110). Thereafter, the Request Message Handler determines if a one-way attribute is set (<RequestMessage.isOneway( )>) (decision block 2120), and if the one-way attribute is set, then process block 2125 discards the result. Returning now to decision block 2120, if the one-way attribute is not set, then the Request Message Handler creates a response message, <new ResponseMessage(result)> (process block 2130). Thereafter, the Request Message Handler sets a correlation identifier or correlation id of the response message to be the message identifier or message id of the request message, <ResponseMessage.setCorrelationId(corrId)> (process block 2140). The Request Message Handler also sets the receiver of the response message to be the sender of the request message, <Message.setReceiver(receiver)> (process block 2150), and sets the sender of the response message to be the receiver of the request message, <Message.setSender (sender)> (process block 2160). Thereafter, the Request Message Handler sends the response message, <Message.send( )> (process block 2170), invoking process block 1650 of the sending message portion 1600 of the Message Facility Layer 220.

Referring next to FIG. 22, FIG. 23, and FIG. 24, three modes of sending the request message and getting the result are illustrated: one-way in FIG. 22, deferred in FIG. 23, or synchronous in FIG. 24.

Referring first to FIG. 22 illustrating the operations preferred in a one-way mode of Request/Response Messaging, if the request message mode is set to one-way before sending (<RequestMessage.setOneway( )>), then the request message is sent as a one-way request message, and the result is discarded (process block 2210).

Referring next to FIG. 23 illustrating the operations preferred in a deferred mode of Request/Response Messaging, the user first checks if the result has arrived, <RequestMessage.checkResult( )> (process block 2310). Thereafter, the user determines if a the result has arrived (decision block 2320), and if the result has arrived, then the user gets the result (process block 2330). Returning now to decision block 2320, if the result has not arrived, then the user can repeat process block 2310 and decision block 2320 at a later time.

Referring next to FIG. 24 illustrating the operations preferred in a synchronous mode of Request/Response Messaging, the user waits for the result until the result arrives, and gets it, <RequestMessage.getResult(-1)> (process block 2410).

Agent Communication Facility Layer Preferred Embodiment

Figure 25:
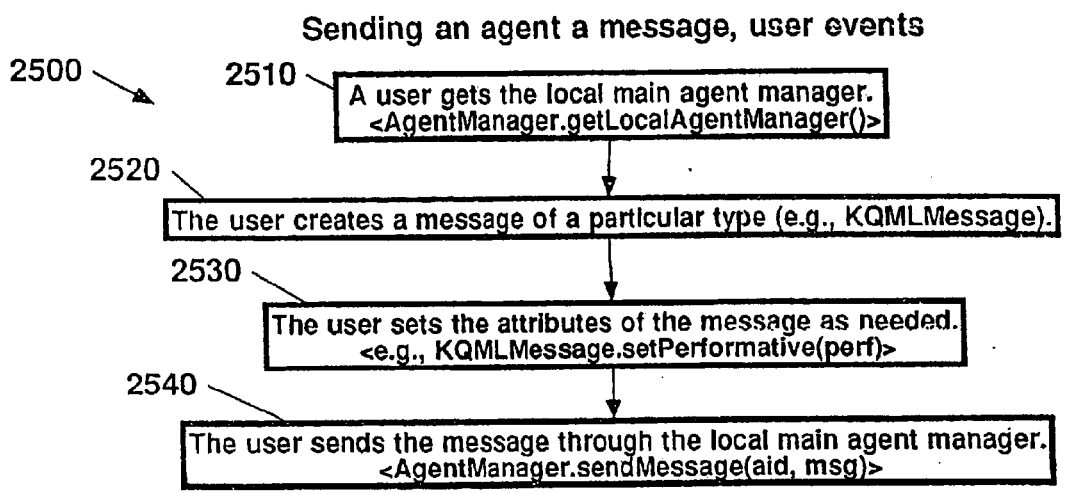
FIG. 25 is a flowchart illustrating the operations preferred in carrying out the agent communication portion of the present invention when a user sends an agent a message.
Figure 26:
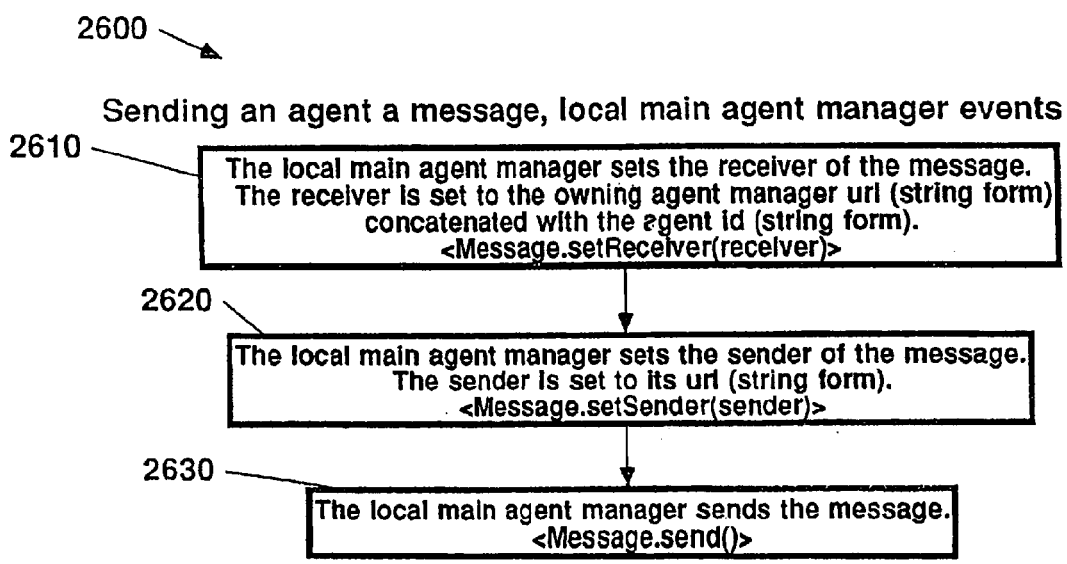
FIG. 26 is a flowchart illustrating the operations preferred in carrying out the agent communication portion of the present invention when a local main agent manager facilitates an agent message.
Figure 27:
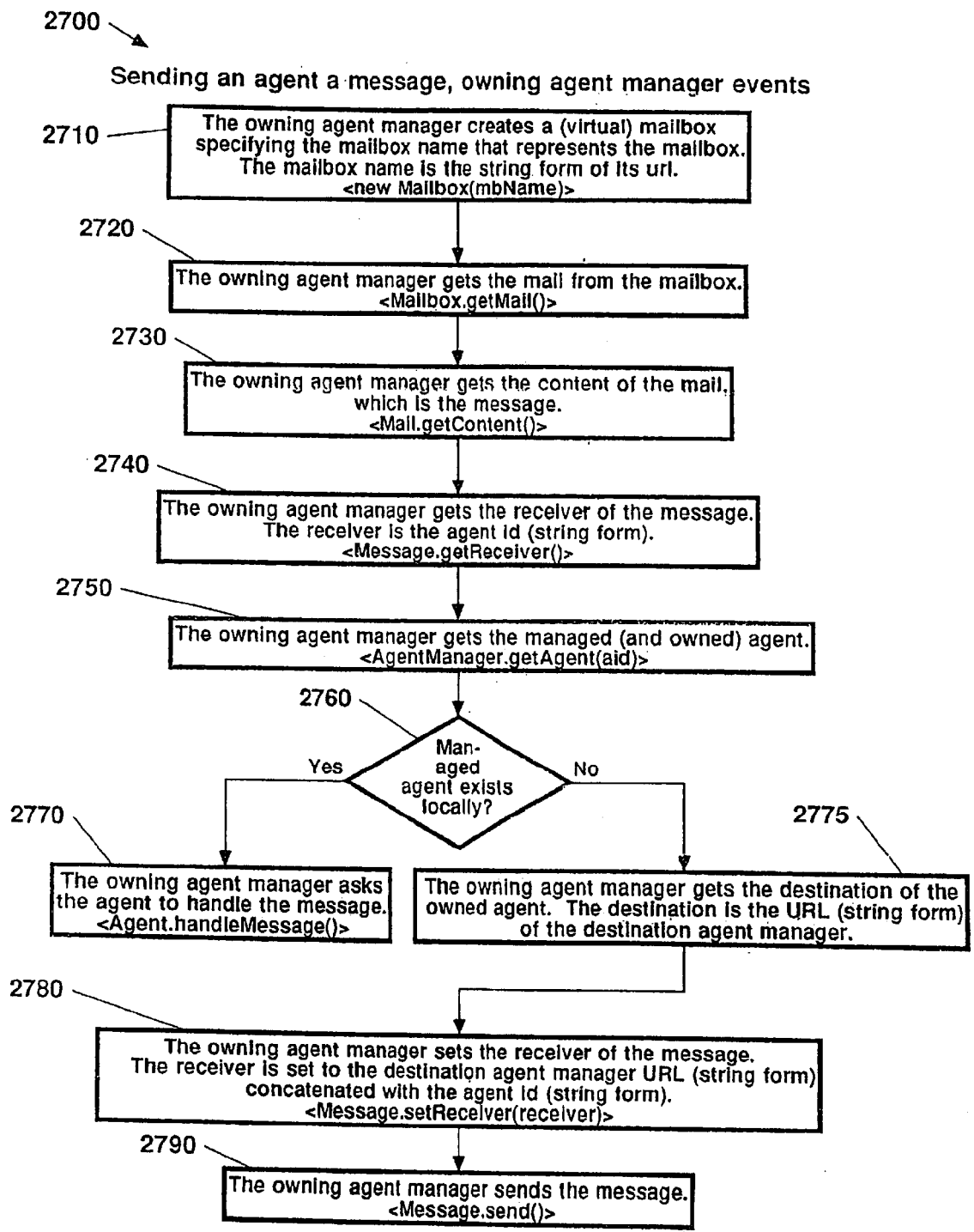
FIG. 27 is a flowchart illustrating the operations preferred in carrying out the agent communication portion of the present invention when an owning agent manager facilitates an agent message.
Figure 28:
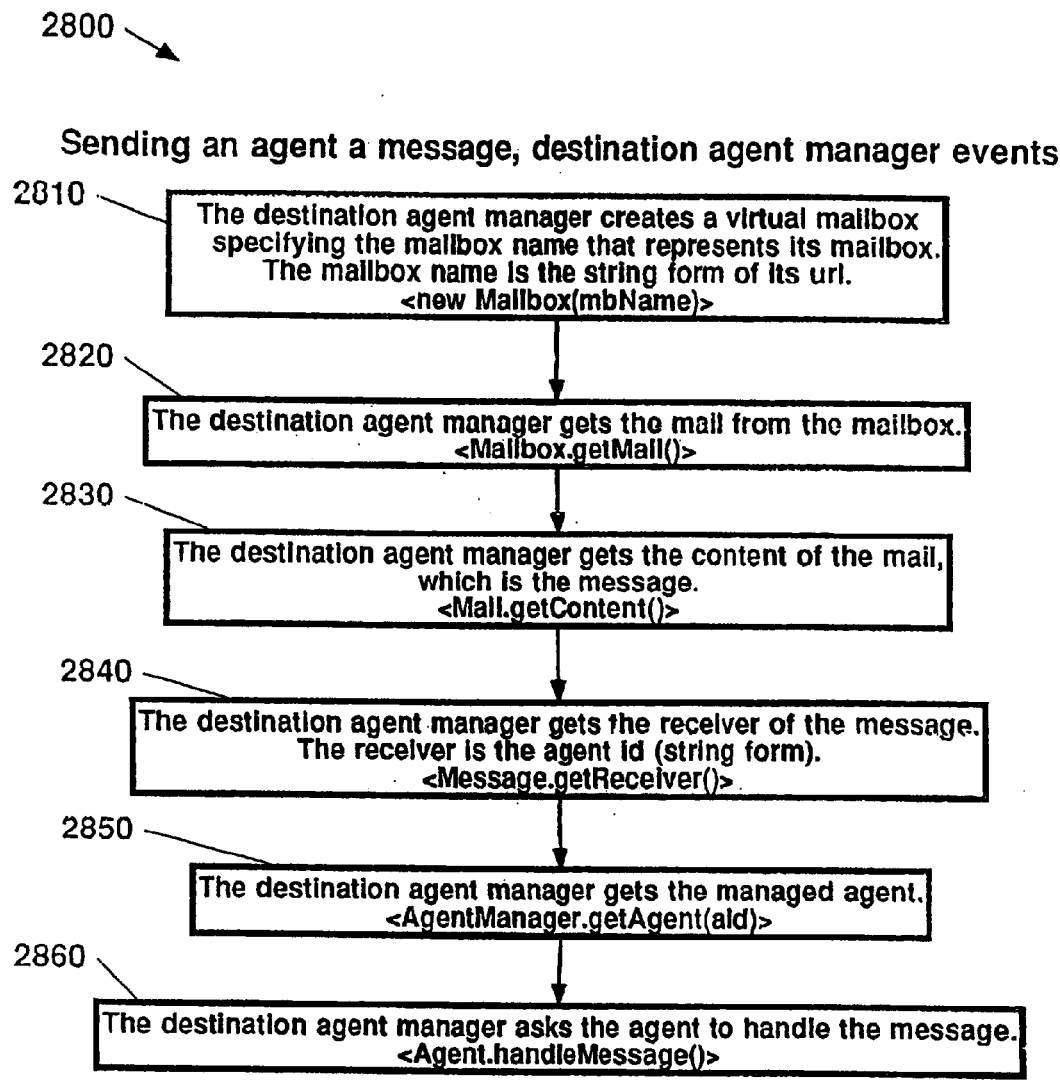
FIG. 28 is a flowchart illustrating the operations preferred in carrying out the agent communication portion of the present invention when a destination agent manager facilitates an agent message.

Referring next to FIG. 25 through FIG. 28, the operations preferred in carrying out the Agent Communication Facility Layer 230 of the present invention are illustrated. FIG. 25 illustrates the operations preferred in carrying out the agent communication portion of the present invention when a user sends an agent a message; FIG. 26 illustrates the operations preferred in carrying out the agent communication portion of the present invention when a local agent manager facilitates an agent message; FIG. 27 illustrates the operations preferred in carrying out the agent communication portion of the present invention when an owning agent manager facilitates an agent message; and FIG. 28 illustrates the operations preferred in carrying out the agent communication portion of the present invention when a destination agent manager facilitates an agent message.

Referring next to FIG. 25 illustrating the operations preferred in carrying out the agent communication facility layer portion of the present invention when a user sends an agent a message, a user first gets the local main agent manager 705, <AgentManager.getLocalAgentManager( )> (process block 2510), wherein the local main agent manager is the default agent manager for managing agents located at the local main agent manager's location or system. Thereafter, the user creates a message 745 of a particular type (e.g., KQMLMessage) (process block 2520), and sets the attributes of the message as needed, <e.g., KQMLMessage.setPerformative(perf)> (process block 2530). The user then sends the message through the local main agent manager 705, <AgentManager.sendMessage (aid, msg)> (process block 2540).

Referring next to FIG. 26 illustrating the operations preferred in carrying out the agent communication facility layer portion of the present invention when a local agent manager facilitates an agent message, the local main agent manager 705 first sets the receiver of the message to the owning agent manager 710 URL (Uniform Resource Locator) in string form concatenated with the agent id in string form, <Message.setReceiver(receiver)> (process block 2610). The owning agent manager is aware of an agent's whereabouts at all times and can cause appropriate message forwarding to the current location of an agent. The local main agent manager 705 also sets the sender of the message to the its URL (string form), <Message.setSender (sender)> (process block 2620), and then sends the message, <Message.send( )> (process block 2630), invoking process block 1650 of the sending message portion 1600 of the Message Facility Layer 220.

Referring next to FIG. 27 illustrating the operations preferred in carrying out the agent communication facility layer portion of the present invention when an owning agent manager facilitates an agent message, the owning agent manager 710 first creates a virtual mailbox 735 specifying the virtual mailbox name 775 that represents it's virtual mailbox wherein the virtual mailbox name is a string form of its URL, <new Mailbox(mbName)> (process block 2710). Thereafter, the owning agent manager 710 gets the mail 765 from the virtual mailbox 735, <Mailbox.getMail( )> (process block 2720), and gets the content of the mail 765, which is the message 750, <Mail.getContent( )> (process block 2730). The owning agent manager 710 also gets the receiver 720 of the message wherein the receiver is the agent id in string form, <Message.getReceiver( )> (process block 2740), and gets the managed and owned agent 720, <AgentManager.getAgent(aid)> (process block 2750). Thereafter, the owning agent manager 710 determines if an agent 720 exists locally (decision block 2760), and if the agent 720 exists locally, then the owning agent manager 710 asks the managed agent 720 (managed agent if local) to handle the message 750, <Agent.handleMessage( )> (process block 2770). Returning now to decision block 2760, if the agent does not exist locally (if the agent has moved to a location managed by a different agent manager 715), then the owning agent manager 710 gets the destination 715 of the owned agent 725 wherein the destination is the URL in string form of the destination agent manager 715 (process block 2775). This is the situation where the agent 725 has moved away from it's owning agent manager 710. Whenever it does so, the owning agent manager 710 is informed of it's new destination and the destination agent manager 715. Thereafter, the owning agent manager 710 sets the receiver of the message wherein the receiver is set to the destination agent manager 715 URL in string form concatenated with the agent id in string form, <Message.setReceiver(receiver)> (process block 2780). The owning agent manager 710 then sends the message 755, <Message.send( )> (process block 2790).

Referring next to FIG. 28 illustrating the operations preferred in carrying out the agent communication portion of the present invention when a destination agent manager facilitates an agent message, the destination agent manager creates a virtual mailbox specifying the virtual mailbox name that represents it's virtual mailbox wherein the virtual mailbox name is a string form of it's URL, <new Mailbox (mbName)> (process block 2810). The destination agent manager is the managing agent manager at the current location of the agent if the agent moves to a location other than that of its owning agent manager. Thereafter, the destination agent manager gets the mail from the virtual mailbox, <Mailbox.getMail( )> (process block 2820); gets the content of the mail which is the message, <Mail.getContent( )> (process block 2830); and gets the receiver of the message wherein the receiver is the agent id in string form, <Message.getReceiver( )> (process block 2840). The destination agent manager then gets the managed and owned agent, <AgentManager.getAgent(aid)> (process block 2850), and asks the managed agent to handle the message, <Agent.handleMessage( )> (process block 2860).

Although the present invention has been particularly shown and described with reference to a preferred embodiment, it will be understood by those skilled in the art that various changes in form and detail may be made without departing from the spirit and the scope of the invention.

TABLE 2

| API User's Guide | Class Hierarchy Package Index | Index |
|---|---|---|
| | Other Packages | |
| | package com.imb.jma.agent | |
| | package com.imb.jma.mail | |
| | package com.imb.jma.mail.impl | |
| | package com.imb.jma.message | |
| | package com.imb.jma.message.handler | |

TABLE 3

All Packages   Class Heirarchy   Index
\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*
package com.ibm.jma.agent
Class Index

• Agent
• AgentID
• AgentManager
Exception Index

• AgentException
All Packages   Class Hierarchy   This Package   Previous   Next   Index
\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*
Class com.ibm.jma.agent.Agent java.lang.Object
    |
    +----com.ibm.jma.agent.Agent \*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*
public abstract class Agent
extends Object
implements Cloneable, MessageHandler
This is the abstract, root class of all agents, stationary or mobile. Each agent has a globally unique identifier and is managed by an agent manager. An agent can communicate with other agents using messages.
See Also:
    AgentManager, AgentID, Message
\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*
Constructor Index

• Agent( )
Method Index

• getID( )
    Gets the identifier of this agent.
• getManager( )
    Gets the (current) agent manager of this agent.
• getMessageTypes( )
    Gets the message types which can be handled by this agent.
• handleMessage(Message)
    Handles the specified message.
• init(AgentManager, AgentID, Object)
Constructors

• Agent
protected Agent( )
Methods

TABLE 3-continued

* init
protected void init      (AgentManager am,
                          AgentID aid,
                          object init)
* getID
public final AgentID getID( )
    Gets the identifier of this agent.
* getManager
public final AgentManager getManager( )
    Gets the (current) agent manager of this agent.
* handleMessage
public boolean handleMessage (Message msg)
    Handles the specified message.
* getMessageTypes
public string getMessageTypes( )
    Gets the message types which can be handled by this agent.
    Returns:
        message types concatenated in a string and separated by spaces.
****************************************************************************
All Packages  Class Hierarchy  This Package  Previous  Next  Index
All Packages  Class Hierarchy  This Package  Previous  Next  Index
****************************************************************************
Class com.ibm.jma.agent.AgentID java.lang.Object
  |
  +----com.ibm.jma.agent.AgentID

****************************************************************************
public final class AgentID
extends Object
implements Serializable
An AgentID object encapsulates an agent's identifier.
****************************************************************************
Constructor Index

* AgentID(byte[])
    Constructs an agent identifier from the specified byte array representation.
* AgentID(String)
    Constructs an agent identifier from the specified string representation.
Method Index

* equals(Object)
    Test if the specified object is an agent identifier and is equal to this agent identifier.
* getID( )
    Gets the byte array representation of this agent identifier.
hashCode( )
    Returns the hash code for this agent identifier.
* toString( )
    Gets the string representation of this agent identifier.
Constructors

* AgentID
public AgentID(byte bid[])
    Constructs an agent identifier from the specified byte array representation.
* AgentID
public AgentID(String sid)
    Constructs an agent identifier from the specified string representation.
Methods

* getID
public byte[] getID( )
    Gets the byte array representation of this agent identifier.
* toString
public String toString( )
    Gets the string representation of this agent identifier.
    Overrides:
        toString in class Object
* equals
public boolean equals(Object obj)
    Test if the specified object is an agent identifier and is equal to this agent identifier.
    Overrides:
        equals in class Object
* hashCode
public int hashCode( )
    Returns the hash code for this agent identifier.
    Overrides:
        hashCode in class Object

TABLE 3-continued

```
****************************************************************************
All Packages   Class Hierarchy   This Package   Previous   Next   Index
All Packages   Class Hierarchy   This Package   Previous   Next   Index
****************************************************************************
```

Class com.ibm.jma.agent.AgentManager java.lang.Object
   |
   +----com.ibm.jma.agent.AgentManager

```
****************************************************************************
``` public final class AgentManager
extends Object
implements MessageHandler
An agent manager manages agents, stationary or mobile, including their communication, mobility, etc. Each agent manager may collaborate with other agent managers to accomplish its tasks.
See Also:
   Agent, AgentID, Message

```
****************************************************************************
```

Field Index

- DEFAULT_AM_NAME
- DEFAULT_PORT_NUMBER
- DEFAULT_PROTOCOL

Method Index

- createAgent(URL, String, Object)
    Creates an agent with the specified codebase, class name, and initialization.
- dispatchAgent(Agent, String)
    Dispatches an agent to the specified destination.
- getAgent(AgentID)
    Gets the agent managed by this agent manager with the specified agent identifier.
- getAgents( )
    Gets all agents managed by this agent manager.
- getDestination(AgentID)
    Gets the destination of the agent owned by this agent manager.
- getLocalAgentManager( )
    Gets the local agent manager.
- getMessageTypes( )
    Gets the message types which can be handled by this agent manager.
- getName( )
    Gets the name of this agent manager.
- getURL( )
    Gets the url of this agent manager.
- handleMessage(Message)
    Handles the specified message.
- retrieveAgent(AgentID)
    Retrieves the agent with the specified agent identifier.
- sendMessage(AgentID, Message)
    Sends the specified message to the agent with the specified identifier.

Fields

- DEFAULT_AM_NAME
public static final String DEFAULT_AM_NAME
- DEFAULT_PROTOCOL
protected static final String DEFAULT_PROTOCOL
- DEFAULT_PORT_NUMBER
protected static final int DEFAULT_PORT_NUMBER Methods

- getLocalAgentManager
public static AgentManager getLocalAgentManager( )
    Gets the local agent manager.
- getURL
public URL getURL( )
    Gets the url of this agent manager.
- getName
public String getName( )
    Gets the name of this agent manager.
- handleMessage
public boolean handleMessage(Message msg)
    Handles the specified message.
    Returns:
        true if the specified message can be handled.
- getMessageTypes
public String getMessageTypes( )
    Gets the message types which can be handled by this agent manager.

TABLE 3-continued

Returns:
    message types concatenated in a string and separated by spaces
- createAgent public Agent createAgent (URL codebase,
                           String classname,
                           Object init) throws AgentException
    Creates an agent with the specified codebase, class name, and initialization. The newly created agent is owned by this agent manager.
- sendMessage public void sendMessage (AgentID aid,
                             Message msg)
    Sends the specified message to the agent with the specified identifier.
- dispatchAgent public void dispatchAgent (Agent a,
                                 string dest)
    Dispatches an agent to the specified destination.
- retrieveAgent public Agent retrieveAgent(AgentID aid)
    Retrieves the agent with the specified agent identifier.
- getAgent public Agent getAgent(AgentID aid)
    Gets the agent managed by this agent manager with the specified agent identifier.
- getAgents public Enumeration getAgents( )
    Gets all agents managed by this agent manager.
- getDestination public String getDestination(AgentID aid)
    Gets the destination of the agent owned by this agent manager.

```
**************************************************************************
```
All Packages   Class Hierarchy   This Package   Previous   Next   Index
All Packages   Class Hierarchy   This Package   Previous   Next   Index
```
**************************************************************************
```
Class com.ibm.jma.agent.AgentException

```
java.lang.Object
   |
   +----java.lang.Throwable
          |
          +----java.lang.Exception
                 |
                 +----com.ibm.jma.agent.AgentException
```

```
**************************************************************************
```
public class AgentException
extends Exception
```
**************************************************************************
```
Constructor Index

- AgentException( )
- AgentException(String)

Constructors

- AgentException public AgentException( )
- AgentException public AgentException(String s)
```
**************************************************************************
```
All Packages   Class Hierarchy   This Package   Previous   Next   Index

TABLE 4

All Packages   Class Hierarchy   Index
```
**************************************************************************
```
package com.ibm.jma.mail
Interface Index

- MailQueue
- PostOffice

Class Index

- Mail
- Mailbox
- URL

All Packages   Class Hierarchy   This Package   Previous   Next   Index
```
**************************************************************************
```
Interface com.ibm.jma.mail.MailQueue TABLE 4-continued public interface MailQueue
This interface is implemented by all mail queues.
See Also:
    Mail
**********************************************************************
Method Index

- close( )
    Closes this mail queue to disallow processing of mail.
- dequeue( )
    Removes a mail from this mail queue.
- dequeue(byte[ ])
    Removes a mail with the specified correlation id from this mail queue.
- dequeue(String)
    Removes a mail with the specified content type from this mail queue.
- enqueue(Mail)
    Adds a mail to this mail queue.
- getName( )
    Returns the name of this mail queue.
- isEmpty( )
    Tests if this mail queue has no mail.
- open( )
    Opens this mail queue for processing of mail.
- size( )
    Returns the number of mail in this mail queue.

Methods

- getName
public abstract String getName( )
    Returns the name of this mail queue.
- enqueue
public abstract void enqueue(Mail mail)
    Adds a mail to this mail queue.
    Parameters:
        mail - the mail to be added
- dequeue
public abstract Mail dequeue( )
    Removes a mail from this mail queue.
    Returns:
        a mail
- dequeue
public abstract Mail dequeue(String type)
    Removes a mail with the specified content type from this mail queue.
    Returns:
        a mail with the specified content type
- dequeue
public abstract Mail dequeue(byte corrId[ ])
    Removes a mail with the specified correlation id from this mail queue.
    Returns:
        a mail with the specified correlation id
- isEmpty
public abstract boolean isEmpty( )
    Tests if this mail queue has no mail.
- size
public abstract int size( )
    Returns the number of mail in this mail queue.
- open
public abstract void open( )
    Opens this mail queue for processing of mail.
- close
public abstract void close( )
    Closes this mail queue to disallow processing of mail.
**********************************************************************
All Packages   Class Hierarchy   This Package   Previous   Next   Index
All Packages   Class Hierarchy   This Package   Previous   Next   Index
**********************************************************************
Interface com.ibm.jma.mail.PostOffice
public interface PostOffice
The PostOffice interface is used to represent post office facility in Jamaica. It provides
APIs for sending and receiving mails between post offices and mail boxes.
See Also:
    PostOfficeRMI
Method Index

- receiveMail(String)
    This method receives mail from a mailbox with name "mbName"
- receiveMail(String, byte[ ])
    This method receives mail that has a correlation id "corrId" from the mail box of
    name "mbName"

TABLE 4-continued

- receiveMail(String, byte[ ], long)
    This method receives mail with correlation id "corrId" with timed wait of
    "waitTime" milliseconds from mailbox "mbName" when it times out a null mail
    object is returned
- receiveMail(String, long)
    This method receives mail with timed wait of "waitTime" milliseconds from a
    mailbox "mbName".
- receiveMail(String, String)
    This method receives mail of type "type" from a mailbox with name "mbName"
- receiveMail(String, String, long)
    This method receives mail of type "type" with timed wait of "waitTime" milliseconds
    from mailbox "mbName" when it times out a null mail object is returned
- sendMail(String, Mail)
    This method sends a mail "mail" to a mailbox with name "mbName"

Methods

- sendMail
public abstract byte[ ] sendMail   (String mbName,
                                    Mail mail)
    This method sends a mail "mail" to a mailbox with name "mbName"
    Parameters:
        mbName - Name of the mailbox to which the mail has to be sent
        mail - The mail object that has to be sent
    Returns:
        A byte array that identifies the mail
- receiveMail
public abstract Mail receiveMail(String mbName)
    This method receives mail from a mailbox with name "mbName"
    Parameters:
        mbName - Name of the mailbox from which to receive mail
    Returns:
        The received mail object
- receiveMail
public abstract Mail receiveMail   (String mbName,
                                    String type)
    This method receives mail of type "type" from a mailbox with name "mbName"
    Parameters:
        mbName - Name of the mailbox from which to receive mail
        type - Type of the mail that is to be received
    Returns:
        The received mail object
- receiveMail
public abstract Mail receiveMail   (String mbName,
                                    byte corrId[ ])
    This method receives mail that has a correlation id "corrId" from the mail box of
    name "mbName"
    Parameters:
        mbName - Name of the mailbox from which to receive mail
        corrId - Correlation id of the mail that is to be received
    Returns:
        The received mail object
- receiveMail
public abstract Mail receiveMail   (String mbName,
                                    long waitTime)
    This method receives mail with timed wait of "waitTime" milliseconds from a
    mailbox "mbName".
    Parameters:
        mbName - Name of the mailbox from which to receive
        waitTime - The number of milliseconds to wait
- receiveMail
public abstract Mail receiveMail   (String mbName,
                                    String type,
                                    long waitTime)
    This method receives mail of type "type" with timed wait of "waitTime" milliseconds
    from mailbox "mbName" when it times out a null mail object is returned
    Parameters:
        mbName - Name of the mail box from which to receive
        type - Type of the mail to be received
        waitTime - Number of milliseconds to wait
    Returns:
        The received mail object
- receiveMail
public abstract Mail receiveMail   (String mbName,
                                    byte corrId[ ],
                                    long waitTime)
    This method receives mail with correlation id "corrId" with timed wait of
    "waitTime" milliseconds from mailbox "mbName" when it times out a null mail
    object is returned
    Parameters:

TABLE 4-continued mbName - Name of the mail box from which to receive
corrId - Correlation Id of the mail to be received
waitTime - Number of milliseconds to wait

***********************************************************************
All Packages   Class Hierarchy   This Package   Previous   Next   Index
All Packages   Class Hierarchy   This Package   Previous   Next   Index
***********************************************************************

Class com.ibm.jma.mail.Mail java.lang.Object
   |
   +----com.ibm.jma.mail.Mail

***********************************************************************
public class Mail
extends Object
implements Serializable
A Mail object is used to transport typed content. Each mail has a type and a content. The format and semantics of the content depends on the content type.
***********************************************************************

Constructor Index

- Mail( )
- Mail(Mail)
- Mail(String, Object)
    Contructs a mail with the specified content type and content.

Method Index

- getContent( )
    Returns the content of this mail.
- getCorrelationId( )
    Returns the correlation id.
- getDestination( )
    Returns the destination of this mail.
- getMailId( )
    Returns the mail id of this mail.
- getPriority( )
    Returns the priority of this mail
- getResponseDestination( )
    Returns the response destination of this mail.
- getType( )
    Returns the content type of this mail.
- setCorrelationId(byte[ ])
    Sets the correlation id for the mail that this mail corresponds to.
- setDestination(String)
    Sets the destination of this mail
- setMailId(byte[ ])
    Sets the mail id of this mail.
- setPriority(int)
    Sets the priority of this mail.
- setResponseDestination(String)
    Sets the response destination of this mail.
- toString( )
    Returns a string representing this mail.

Constructors

- Mail
public Mail    (String type,
               Object content)
    Contructs a mail with the specified content type and content.
    Parameters:
        type - the content type of this mail
        content- the content of this mail
- Mail
protected Mail( )
- Mail
protected Mail(Mail m)

Methods

- toString
public String toString( )
    Returns a string representing this mail.
    Overrides:
        toString in class Object
- getType
public String getType( )
    Returns the content type of this mail.
- getContent TABLE 4-continued

```
public Object getContent( )
     Returns the content of this mail.
• setMailId
public void setMailId(byte id[ ])
     Sets the mail id of this mail.
• getMailId
public byte[ ] getMailId( )
     Returns the mail id of this mail.
• setCorrelationId
public void setCorrelationId(byte id[ ])
     Sets the correlation id for the mail that this mail corresponds to. Required for a
     response mail.
• getCorrelationId
public byte[ ] getCorrelationId( )
     Returns the correlation id.
• setPriority
public void setPriority(int priority)
     Sets the priority of this mail. The priority ranges from 1 to 10. The default is 5.
• getPriority
public int getPriority( )
     Returns the priority of this mail
• setDestination
public void setDestination(String dest)
     Sets the destination of this mail
• getDestination
public String getDestination( )
     Returns the destination of this mail.
• setResponseDestination
public void setResponseDestination(String respDest)
     Sets the response destination of this mail.
• getResponseDestination
public String getResponseDestination( )
     Returns the response destination of this mail.
*******************************************************************
All Packages   Class Hierarchy   This Package   Previous   Next   Index
All Packages   Class Hierarchy   This Package   Previous   Next   Index
*******************************************************************
Class com.ibm.jma.mail.Mailbox java.lang.Object
   |
   +----com.ibm.jma.mail.Mailbox

*******************************************************************
public class Mailbox
extends Object
A Mailbox object is used to send (put) and receive (get) mail. A mailbox is virtual. To send
a mail, one simply opens a mailbox with the name that represents the destination for the
mail and puts the mail in the mailbox. To receive a mail, one again simply opens a mailbox
with the name that represents the location for the mail and gets the mail from the mailbox.
See Also:
     Mail
*******************************************************************
Constructor Index

• Mailbox(String)
     Constructs (opens) a mailbox with the specified name.
Method Index

• getMail( )
     Gets (receives) a mail from this mailbox.
• getMail(byte[ ])
     Gets (receives) a mail with the specified correlation id from this mailbox.
• getMail(byte[ ], long)
     Gets (receives) a mail with the specified correlation id from this mailbox, waiting if
     the mail arrives within the specified wait time.
• getMail(long)
     Gets (receives) a mail from this mailbox, waiting if the mail arrives within the
     specified wait time.
• getMail(String)
     Gets (receives) a mail with the specified content type from this mailbox.
• getMail(String, long)
     Gets (receives) a mail with the specified content type from this mailbox, waiting if
     the mail arrives within the specified wait time.
• getName( )
     Returns the name of this mailbox.
• putMail(Mail)
     Puts a mail in this mailbox (i.e., sends a mail to this mailbox).
```

TABLE 4-continued

Constructors

• Mailbox
public Mailbox(String name)
    Constructs (opens) a mailbox with the specified name.
Methods

• getName
public String getName( )
    Returns the name of this mailbox.
• putMail
public byte[ ] putMail(Mail mail)
    Puts a mail in this mailbox (i.e., sends a mail to this mailbox).
    Parameters:
        mail - the mail to be sent
    Returns:
        the mail id of the mail sent
• getMail
public Mail getMail( )
    Gets (receives) a mail from this mailbox. If there is no mail, it returns null.
    Returns:
        a mail
• getMail
public Mail getMail(long waitTime)
    Gets (receives) a mail from this mailbox, waiting if the mail arrives within the
    specified wait time. If the wait time is set to −1, it waits forever until the mail arrives.
    Returns:
        a mail
• getMail
public Mail getMail(String type)
    Gets (receives) a mail with the specified content type from this mailbox. If there is
    no such mail, it returns null.
    Returns:
        a mail with the specified content type
• getMail
public Mail getMail  (String type,
                    long waitTime)
    Gets (receives) a mail with the specified content type from this mailbox, waiting if
    the mail arrives within the specified wait time. If the wait time is set to −1, it waits
    forever until the mail arrives.
    Parameters:
        type - the content type of the mail to be received
        waitTime - the time (in msecs) to wait for the mail to arrive
    Returns:
        a mail with the specified content type
• getMail
public Mail getMail(byte corrId[ ])
    Gets (receives) a mail with the specified correlation id from this mailbox. If there is
    no such mail, it returns null,
    Returns:
        a mail with the specified correlation id
• getMail
public Mail getMail  (byte corrId[ ],
                    long waitTime)
    Gets (receives) a mail with the specified correlation id from this mailbox, waiting if
    the mail arrives within the specified wait time. If the wait time is set to −1, it waits
    forever until the mail arrives.
    Parameters:
        corrId - the correlation id of the mail to be received
        waitTime - the time (in msecs) to wait for the mail to arrive
    Returns:
        a mail with the specified correlation id
****************************************************************************
All Packages   Class Hierarchy   This Package   Previous   Next   Index
All Packages   Class Hierarchy   This Package   Previous   Next   Index
****************************************************************************
Class com.ibm.jma.mail.URL java.lang.Object
   |
   +----com.ibm.jma.mail.URL

****************************************************************************
public final class URL
extends Object
implements Serializable
****************************************************************************

TABLE 4-continued

Constructor Index

- URL(String)
- URL(String, String, int, String)

Method Index

- equals(URL)
- getFile( )
- getHost( )
- getName( )
- getPort( )
- getProtocol( )
- getRef( )
- setRef(String)
- toString( )

Constructors

- URL
public URL(String spec) throws MalformedURLException
- URL
public URL   (String protocol,
            String hostName,
            int portNumber,
            String fileName) throws MalformedURLException Methods

- getProtocol
public String getProtocol( )
- getHost
public String getHost( )
- getPort
public int getPort( )
- getFile
public String getFile( )
- setRef
public void setRef(String ref)
- getRef
public String getRef( )
- equals
public boolean equals(URL obj)
- toString
public String toString( )
    Overrides:
        toString in class Object
- getName
public String getName( )
**************************************************************
All Packages   Class Hierarchy   This Package   Previous   Next   Index

TABLE 5

All Packages   Class Hierarchy   Index
**************************************************************
package com.ibm.jma.mail.impl
Interface Index

- PostOfficeRemoteRMI

Class Index

- MemMailQueue
- POServer
- PostOfficeRMI
- SQLMailQueue

Exception Index

- NoSuchMailException
- NotImplementedException

All Packages   Class Hierarchy   This Package   Previous   Next   Index
**************************************************************
Interface
com.ibm.jma.mail.impl.PostOfficeRemoteRMI
public interface PostOfficeRemoteRMI
extends Remote
**************************************************************

TABLE 5-continued

Method Index

- deliverMail(String, Mail)
- deliverMail(String, Mail[])
- getName()
- retrieveMail(String, byte[], long)
- retrieveMail(String, long)
- retrieveMail(String, String, long)

Methods

- getName
public abstract String getName() throws RemoteException
- deliverMail
public abstract void deliverMail(String mbId,
                Mail mail) throws RemoteException
- deliverMail
public abstract void deliverMail(String mbId,
                Mail mails[]) throws RemoteException
- retrieveMail
public abstract Mail retrieveMail(String mbId,
                long waitTime) throws RemoteException
- retrieveMail
public abstract Mail retrieveMail(String mbId,
                String type,
                long waitTime) throws RemoteException
- retrieveMail
public abstract Mail retrieveMail(String mbId,
                byte corrId[],
                long waitTime) throws RemoteException
********************************************************************************
All Packages   Class Hierarchy   This Package   Previous   Next   Index
All Packages   Class Hierarchy   This Package   Previous   Next   Index
********************************************************************************
Class
com.ibm.jma.mail.impl.MemMailQueue java.lang.Object
   |
   +---- com.ibm.jma.mail.impl.MemMailQueue public class MemMailQueue
extends Object
implements MailQueue
********************************************************************************
Constructor Index

- MemMailQueue()

Method Index

- close()
- dequeue()
- dequeue(byte[])
- dequeue(String)
- enqueue(Mail)
- getName()
- isEmpty()
- open()
- size()

Constructors

- MemMailQueue
public MemMailQueue()

Methods

- getName
public String getName()
- isEmpty
public synchronized boolean isEmpty()
- size
public int size()
- enqueue
public synchronized void enqueue(Mail mail)
- dequeue
public synchronized Mail dequeue()
- dequeue
public synchronized Mail dequeue(byte corrId[])
- dequeue
public synchronized Mail dequeue(String mailType)

TABLE 5-continued

* open
public void open( )
* close
public void close( )
```
************************************************************************
```
All Packeges   Class Hierarchy   This Package   Previous   Next   Index
All Packeges   Class Hierarchy   This Package   Previous   Next   Index
```
************************************************************************
```
Class com.ibm.jma.mail.impl.POServer java.lang.Object
   |
   +---- java.awt.Component
            |
            +---- java.awt.Container
                     |
                     +---- java.awt.Window
                              |
                              +---- java.awt.Frame
                                       |
                                       +---- com.ibm.jma.mail.impl.POServer

```
************************************************************************
```
public class POServer
extends Frame
implements ItemListener
```
************************************************************************
```
Constructor Index

* POServer(String)

Method Index

* action(Event, Object)
* itemStateChanged(ItemEvent)
* main(String[])
* minimumSize( )
* preferredSize( )

Constructors

* POServer
public POServer(String n)

Methods

* preferredSize
public Dimension preferredSize( )
    Overrides:
        preferredSize in class Container
* minimumSize
public Dimension minimumSize( )
    Overrides:
        minimumSize in class Container
* itemStateChanged
public void itemStateChanged(ItemEvent evt)
* action
public boolean action(Event evt,
              Object arg)
    Overrides:
        action in class Component
* main
public static void main(String args[])
```
************************************************************************
```
All Packages   Class Hierarchy   This Package   Previous   Next   Index
All Packages   Class Hierarchy   This Package   Previous   Next   Index
```
************************************************************************
```
Class
com.ibm.jma.mail.impl.PostOfficeRMI java.lang.Object
   |
   +---- java.rmi.server.RemoteObject
            |
            +---- java.rmi.server.RemoteServer
                     |
                     +---- java.rmi.server.UnicastRemoteObject
                              |
                              +---- com.ibm.jma.mail.impl.PostOfficeRMI TABLE 5-continued

```
****************************************************************
public class PostOfficeRMI
extends UnicastRemoteObject
implements PostOfficeRemoteRMI, PostOffice
****************************************************************
```
Method Index

- deliverMail(String, Mail)
- deliverMail(String, Mail[])
- getLocalPostOffice( )
- getName( )
- receiveMail(String)
- receiveMail(String, byte[])
- receiveMail(String, byte[], long)
- receiveMail(String, long)
- receiveMail(String, String)
- receiveMail(String, String, long)
- retrieveMail(String, byte[], long)
- retrieveMail(String, long)
- retrieveMail(String, String, long)
- sendMail(String, Mail)

Methods

- getLocalPostOffice
public static synchronized PostOfficeRMI getLocalPostOffice( ) throws Rei
- getName
public String getName( ) throws RemoteException
- deliverMail
public void deliverMail(String mbId,
                Mail mail) throws RemoteException
- deliverMail
public void deliverMail(String mbId,
                Mail maillist[]) throws RemoteException
- retrieveMail
public Mail retrieveMail(String mbId,
                long waitTime) throws RemoteException, Illegal
- retrieveMail
public Mail retrieveMail(String mbId,
                String type,
                long waitTime) throws RemoteException, Illegal
- retrieveMail
public Mail retrieveMail(String mbId,
                byte corrId[],
                long waitTime) throws RemoteException, Illegal
- sendMail
public byte[] sendMail(String mbName,
                Mail mail)
- receiveMail
public Mail receiveMail(String mbName)
receiveMail
public Mail receiveMail(String mbName,
                long waitTime)
- receiveMail
public Mail receiveMail(String mbName,
                String type)
- receiveMail
public Mail receiveMail(String mbName,
                String type,
                long waitTime)
- receiveMail
public Mail receiveMail(String mbName,
                byte corrId[])
- receiveMail
public Mail receiveMail(String mbName,
                byte corrId[],
                long waitTime)

```
****************************************************************
```
All Packages   Class Hierarchy   This Package   Previous   Next   Index
All Packages   Class Hierarchy   This Package   Previous   Next   Index
```
****************************************************************
```
Class
com.ibm.jma.mail.impl.SQLMailQueue java.lang.Object
  |
  + ---- com.ibm.jma.mail.impl.SQLMailQueue

```
****************************************************************
```

TABLE 5-continued

```
public class SQLMailQueue
extends Object
implements MailQueue
************************************************************
Constructor Index

• SQLMailQueue(String)
Method Index

• close( )
• dequeue( )
• dequeue(byte[ ])
• dequeue(String)
• enqueue(Mail)
• getName( )
• isEmpty( )
• open( )
• size( )
Constructors

• SQLMailQueue
public SQLMailQueue(String name)
Methods

• getName
public String getName( )
• enqueue
public synchronized void enqueue(Mail mail)
• dequeue
public synchronized Mail dequeue( )
• dequeue
public synchronized Mail dequeue(byte corrId[ ])
• dequeue
public synchronized Mail dequeue(String mailType)
• isEmpty
public synchronized boolean isEmpty( )
• size
public int size( )
• open
public void open( )
• close
public void close( )
************************************************************
All Packages    Class Hierarchy    This Package    Previous    Next    Index
All Packages    Class Hierarchy    This Package    Previous    Next    Index
************************************************************
Class
com.ibm.jma.mail.impl.NoSuchMailException java.lang.Object
    |
    +---- java.lang.Throwable
             |
             +---- java.lang.Exception
                      |
                      +---- com.ibm.jma.mail.impl.NoSuchMailException

************************************************************
public final class NoSuchMailException
extends Exception
************************************************************
Constructor Index

• NoSuchMailException( )
• NoSuchMailException(byte[ ])
Constructors

• NoSuchMailException
public NoSuchMailException( )
• NoSuchMailException
public NoSuchMailException(byte corrId[ ])
************************************************************
All Packages    Class Hierarchy    This Package    Previous    Next    Index
All Packages    Class Hierarchy    This Package    Previous    Next    Index
************************************************************
Class
com.ibm.jma.mail.impl.NotImplementedException
```

TABLE 5-continued

```
java.lang.Object
  |
  +---- java.lang.Throwable
          |
          +---- java.lang.Exception
                  |
                  +---- com.ibm.jma.mail.impl.NotImplementedException
```

\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\* public final class NotImplementedException
extends Exception
\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*

Constructor Index

- NotImplementedException( )
- NotImplementedException(Object)

Constructors

- NotImplementedException
public NotImplementedException( )
- NotImplementedException
public NotImplementedException (Object obj)

\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*

All Packages   Class Hierarchy   This Package   Previous   Next   Index

TABLE 6

All Packages   Class Hierarchy   Index
\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\* package com.ibm.jma.message
Class Index

- ATRequestMessage
- ATResponseMessage
- KQMLMessage
- Message
- RequestMessage
- ResponseMessage All Packages   Class Hierarchy   This Package   Previous   Next   Index
\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*

Class
com.ibm.jma.message.ATPRequestMessage

```
java.lang.Object
  |
  +----com.ibm.jma.message.Message
          |
          +----com.ibm.jma.message.RequestMessage
                  |
                  +----com.ibm.jma.message.ATRequestMessage
```

\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\* public class ATRequestMessage
extends RequestMessage
An ATRequestMessage object is used to send agent transfer requests.
See Also:
    RequestMessage
\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*

Constructor Index

- ATRequestMessage( )

Constructors

- ATRequestMessage
public ATRequestMessage( )
\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*

All Packages   Class Hierarchy   This Package   Previous   Next   Index
All Packages   Class Hierarchy   This Package   Previous   Next   Index
\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*

Class
com.ibm.jma.message.ATResponseMessage

TABLE 6-continued

```
java.lang.Object
   |
   +----com.ibm.jma.message.Message
              |
              +----com.ibm.jma.message.ResponseMessage
                         |
                         +----com.ibm.jma.message.ATResponseMessage
```

*****************************************************************
public class ATResponseMessage
extends ResponseMessage
A ATResponseMessage object is used to send back the result of an agent request message.
See Also:
    RequestMessage
*****************************************************************
Constructor Index

- ATResponseMessage(Object)
    Constructs an agent transfer response message with the specified result.

Method Index

- getParameters( )
    Gets the parameters of the result.
- setParameters(Hashtable)
    Sets the parameters of the result.

Constructors

- ATResponseMessage
public ATResponseMessage(Object result)
    Constructs an agent transfer response message with the specific result.

Methods

- setParameters
public void setParameters(Hashtables params)
    Sets the parameters of the result.
- getParameters
public Hashtable getParameters( )
    Gets the parameters of the result.
*****************************************************************
All Packages   Class Hierarchy   This Package   Previous   Next   Index
All Packages   Class Hierarchy   This Package   Previous   Next   Index
*****************************************************************
Class
com.ibm.jma.message.KQMLMessage

```
java.lang.Object
   |
   +----com.ibm.jma.message.Message
              |
              +----com.ibm.jma.message.KQMLMessage
```

*****************************************************************
public class KQMLMessage
extends Message
A KQMLMessage object is used to send messages following the KQML format and protocol.
*****************************************************************
Constructor Index

- KQMLMessage( )
    Constructs a KQML message.

Method Index

- getContent( )
    Gets the content.
- getInReplyTo( )
    Gets the identifier that this message is replying to.
- getInReplyWith( )
    Gets the identifier that this message is to be repled with.
- getLanguage( )
    Gets the content language.
- getOntology( )
    Gets the content ontology.
- getPerformative( )
    Gets the performative.
- setContent(Object)
    Sets the content.
- setInReplyTo(String)

TABLE 6-continued

Sets the identifier that this message is replying to.
- setLanguage(String)
    Sets the content language.
- setOntology(String)
    Sets the content ontology.
- setPerformative(String)
    Sets the performative.
- setReplyWith(String)
    Sets the identifier that this message is to be repled with.

Constructors

- KQMLMessage
public KQMLMessage( )
    Constructs a KQML message.

Methods

- setPerformative
public void setPerformative(String perf)
    Sets the performative.
- getPerformative
public String getPerformative( )
    Gets the performative.
- setInReplyTo
public void setInReplyTo(String irt)
    Sets the identifier that this message is replying to.
- getInReplyTo
public String getInReplyTo( )
    Gets the identifier that this message is replying to.
- setReplyWith
public void setReplyWith(String rw)
    Sets the identifier that this message is to be repled with.
- getInReplyWith
public String getInReplyWith( )
    Gets the identifier that this message is to be repled with.
- setLanguage
public void setLanguage(String lang)
    Sets the content language.
- getLanguage
public String getLanguage( )
    Gets the content language.
- setOntology
public void setOntology(String onto)
    Sets the content ontology.
- getOntology
public String getOntology( )
    Gets the content ontology.
- setContent
public void setContent(Object content)
    Sets the content.
- getContent
public Object getContent( )
    Gets the content.

\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*

All Packages   Class Hierarchy   This Package   Previous   Next   Index
All Packages   Class Hierarchy   This Package   Previous   Next   Index \*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*

Class com.ibm.jma.message.Message java.lang.Object
   |
   +----com.ibm.jma.message.Message \*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\* public abstract class Message
extends Object
implements Serializable
This is the abstract, root class of all types of messages. A Message object is used to
encapsulate the information which is to be sent from a sender to a receiver. Its class name
represents its type, which determines its format and semantics. Each type of messages may
be associated with a corresponding type of message handlers which are designed to handle
the messages.
See Also:
    MessageHandler \*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*

Field Index

- mailId

TABLE 6-continued

Constructor Index

* Message( )

Method Index

* getReceiver( )
    Gets the receiver of this message.
* getReceiverMB( )
    Gets the receiver mailbox of this message.
* getSender( )
    Gets the sender of this message.
* getSenderMB( )
    Gets the sender mailbox of this message.
* send( )
    Sends this message to the receiver.
* setReceiver(String)
    Sends the receiver of this message.
* setSender(String)
    Sets the sender of this message.

Fields

* mailId
protected byte mailId[ ]

Constructors

* Message
public Message( )

Methods

* setSender
public void setSender(String sender)
    Sets the sender of this message.
* getSender
public String getSender( )
    Gets the sender of this message.
* getSenderMB
public String getSenderMB( )
    Gets the sender mailbox of this message.
* setReceiver
public void setReceiver(String receiver)
    Sets the receiver of this message.
* getReceiver
public String getReceiver( )
    Gets the receiver of this message.
* getReceiverMB
public String getReceiverMB( )
    Gets the receiver mailbox of this message.
* send
public void send( )
    Sends this message to the receiver. This operation uses the Jamaica Mail Facility
    (com.ibm.jma.mail) to accomplish its task.

\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*

All Packages   Class Hierarchy   This Package   Previous   Next   Index
All Packages   Class Hierarchy   This Package   Previous   Next   Index \*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*

Class
com.ibm.jma.message.RequestMessage java.lang.Object
   |
   +----com.ibm.jma.message.Message
            |
            +----com.ibm.jma.message.RequestMessage \*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\* public class RequestMessage
extends Message
A RequestMessage object is used to send message which return a result. A request
message can be sent in three different modes: one-way (asynchronous, discarding the
result), synchronous (blocking until the result arrives), or deferred (obtaining the result at a
later time). The result of a request message is contained in a response message.
See Also:
    ResponseMessage \*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*

Constructor Index

* RequestMessage( )
    Constructs a request message.

TABLE 6-continued

Method Index

- checkResult( )
    Tests if the result has arrived.
- getMessageId( )
    Gets the message id.
- getOperation( )
    Gets the operation to be performed by the receiver of this message.
- getParameters( )
    Gets the parameters of the operation.
- getResult( )
    Gets the result.
- getResult(long)
    Gets the result if it arrives within the specified wait time.
- isClone( )
    Tests if this message is a clone.
- isOneway( )
    Tests if the messaging mode is one-way.
- isRead( )
    Tests if the result has been read.
- isSent( )
    Tests if this message has been sent.
- send( )
    Sends this message.
- setClone( )
    Indicates that this message is a clone.
- setMessageId(byte[ ])
    Sets the message id.
- setOneway( )
    Sets the messaging mode to one-way.
- setOperation(String)
    Sets the operation to be performed by the receiver of this message.
- setParameters(Hashtable)
    Sets the parameters of the operation.

Constructors

- RequestMessage
public RequestMessage( )
    Constructs a request message.

Methods

- setMessageId
protected void setMessageId(byte magId[ ])
    Sets the message id.
- getMessageId
public byte[ ] getMessageId( )
    Gets the message id.
- setOneway
public void setOneway( )
    Sets the messaging mode to one-way. The result, if any, will be discarded.
- isOneway
public boolean isOneway( )
    Tests if the messaging mode is one-way.
- setOperation
public void setOperation(String oper)
    Sets the operation to be performed by the receiver of this message.
- getOperation
public String getOperation( )
    Gets the operation to be performed by the receiver of this message.
- setParameters
public void setParameters(Hashtable params)
    Sets the parameters of the operation.
- getParameters
public Hashtable getParameters( )
    Gets the parameters of the operation.
- send
public void send( )
    Sends this message.
    Overrides:
        send in class Message
- isSent
public boolean isSent( )
    Tests if this message has been sent.
- setClone
public void setClone( )
    Indicates that this message is a clone.
- isClone
public boolean isClone( )
    Tests if this message is a clone.

TABLE 6-continued

* checkResult
public boolean checkResult( )
    Tests if the result has arrived.
* getResult
public Object getResult( )
    Gets the result. If the result has not arrived, returns null.
* getResult
public Object getResult(long waitTime)
    Gets the result if it arrives within the specified wait time. If the wait time is set to −1,
    waits forever until the result arrives.
    Returns:
        the result
* isRead
public boolean isRead( )
    Tests if the result has been read.
*********************************************************************
All Packages   Class Hierarchy   This Package   Previous   Next   Index
All Packages   Class Hierarchy   This Package   Previous   Next   Index
*********************************************************************
Class
com.ibm.jma.message.ResponseMessage java.lang.Object
   |
   +----com.ibm.jma.message.Message
       |
       +----com.ibm.jma.message.ResponseMessage

*********************************************************************
public class ResponseMessage
extends Message
A ResponseMessage object is used to send back the result of a request message.
See Also:
    RequestMessage
*********************************************************************
Constructor Index

* ResponseMessage(Object)
    Constructs a response message with the specified result.
Method Index

* getCorrelationId( )
    Gets the correlation id.
* getResult( )
    Gets the result that this message contains.
* setCorrelationId(byte[ ])
    Sets the correlation id for the corresponding request message.
Constructors

* ResponseMessage
public ResponseMessage(Object result)
    Constructs a response message with the specified result.
Methods

* setCorrelationId
public void setCorrelationId(byte corrId[ ])
    Sets the correlation id for the corresponding request message.
* getCorrelationId
public byte[ ] getCorrelationId( )
    Gets the correlation id.
* getResult
public Object getResult( )
    Gets the result that this message contains.
*********************************************************************
All Packages   Class Hierarchy   This Package   Previous   Next   Index

TABLE 7

All Packages   Class Hierarchy   Index
*********************************************************************
package com.ibm.jma.message.handler
Interface Index

* MessageHandler
Class Index

TABLE 7-continued

- ATRequestMessageHandler
- ATResponseMessageHandler
- KQMLMessageHandler
- KSQLMessageHandler
- RequestMessageHandler
- ResponseMessageHandler All Packages   Class Hierarchy   This Package   Previous   Next   Index
****************************************************************************

Interface
com.ibm.jma.message.handler.MessageHandler
public interface MessageHandler
This interface is implemented by all message handlers. Each type of message handlers is designed to handle an associated type(s) of messages.
See Also:
    Message
****************************************************************************

Method Index

- getMessageTypes( )
    Gets the message type which can be handled by this message handler.
- handleMessage(Message)
    Handles the specified message.

Methods

- handleMessage
public abstract boolean handleMessage(Message msg)
    Handles the specified message.
    Returns:
        true if the specified message can be handled.
- getMessageTypes
public abstract String getMessageTypes( )
    Gets the message types which can be handled by this message handler.
    Returns:
        message types concatenated in a string and separated by spaces
****************************************************************************
All Packages   Class Hierarchy   This Package   Previous   Next   Index
All Packages   Class Hierarchy   This Package   Previous   Next   Index
****************************************************************************

Class
com.ibm.jma.message.handler.ATRequestMessageHandler java.lang.Object
   |
   +----com.ibm.jma.message.handler.RequestMessageHandler
        |
        +----com.ibm.jma.message.handlerATRequestMessageHandler

**************************************************************************** public class ATRequestMessageHandler
extends RequestMessageHandler
The handler for handling agent transfer request messages.
See Also:
    Message
****************************************************************************

Constructor Index

- ATRequestMessageHandler( )

Method Index

- getMessageTypes( )
    Gets the message types which can be handled by this message handler.
- handleMessage(Message)
    Handles the specified message.

Constructors

- ATRequestMessageHandler
public ATRequestMessageHandler( )

Methods

- handleMessage
public boolean handleMessage (Message msg)
    Handles the specified message.
    Returns:
        true if the specified message can be handled.
    Overrides:
        handleMessage in class RequestMessageHandler
- getMessageTypes
public String getMessageTypes( )

TABLE 7-continued

```
    Gets the message types which can be handled by this message handler.
    Returns:
        message types concatenated in a string and separated by spaces
    Overrides:
        getMessageTypes in class RequestMessageHandler
***************************************************************************
All Packages   Class Hierarchy   This Package   Previous   Next   Index
All Packages   Class Hierarchy   This Package   Previous   Next   Index
***************************************************************************
Class
com.ibm.jma.message.handler.ATResponseMessageHandler java.lang.Object
   |
   +----com.ibm.jma.message.handler.ResponseMessageHandler
            |
            +----com.ibm.jma.message.handler.ATResponseMessageHandler

***************************************************************************
public class ATResponseMessageHandler
extends ResponseMessageHandler
The handler for handling agent transfer response messages.
See Also:
    Message
***************************************************************************
Constructor Index

• ATResponseMessageHandler( )
Method Index

• getMessageTypes( )
    Gets the message types which can be handled by this message handler.
• handleMessage(Message)
    Handles the specified message.
Constructors

• ATResponseMessageHandler
public ATResponseMessageHandler( )
Methods

• handleMessage
public boolean handleMessage(Message msg)
    Handles the specified message.
    Returns:
        true if the specified message can be handled.
    Overrides:
        handleMessage in class ResponseMessageHandler
• getMessageTypes
public String getMessageTypes( )
    Gets the message types which can be handled by this message handler.
    Returns:
        message types concatenated in a string and separated by spaces
    Overrides:
        getMessageTypes in class ResponseMessageHandler
***************************************************************************
All Packages   Class Hierarchy   This Package   Previous   Next   Index
All Packages   Class Hierarchy   This Package   Previous   Next   Index
***************************************************************************
Class
com.ibm.jma.message.handler.KQMLMessageHandler java.lang.Object
   |
   +----com.ibm.jma.message.handler.KQMLMessageHandler

***************************************************************************
public class KQMLMessageHandler
extends Object
implements MessageHandler
The handler for handling KQML messages.
See Also:
    KQMLMessage, KSQLMessageHandler
***************************************************************************
Constructor Index

• KQMLMessageHandler( )
```

TABLE 7-continued

Method Index

* getMessageTypes( )
    Gets the message types which can be handled by this message handler.
* handleMessage(Message)
    Handles the specified message.
Constructors

* KQMLMessageHandler
public KQMLMessageHandler( )
Methods

* handleMessage
public boolean handleMessage(Message msg)
    Handles the specified message.
    Returns:
        true if the specified message can be handled.
* getMessageTypes
public String getMessageTypes( )
    Gets the message types which can be handled by this message handler.
    Returns:
        message types concatenated in a string and separated by spaces
**************************************************************
All Packages   Class Hierarchy   This Package   Previous   Next   Index
All Packages   Class Hierarchy   This Package   Previous   Next   Index
**************************************************************
Class
com.ibm.jma.message.handler.KSQLMessageHandler java.lang.Object
   |
   +----com.ibm.jma.message.handler.KQMLMessageHandler
           |
           +----com.ibm.jma.message.handler.KSQLMessageHandler

**************************************************************
public class KSQLMessageHandler
extends KQMLMessageHandler
The handler for handling KQML messages whose content language is SQL.
See Also:
    KQMLMessage, KQMLMessageHandler
**************************************************************
Constructor Index

* KSQLMessageHandler( )
Method Index

* handleMessage(Message)
    Handles the specified message.
Constructors

* KSQLMessageHandler
public KSQLMessageHandler( )
Methods

* handleMessage
public boolean handleMessage(Message msg)
    Handles the specified message.
    Returns:
        true if the specified message can be handled.
    Overrides:
        handleMessage in class KQMLMessageHandler
**************************************************************
All Packages   Class Hierarchy   This Package   Previous   Next   Index
All Packages   Class Hierarchy   This Package   Previous   Next   Index
**************************************************************
Class
com.ibm.jma.message.handler.RequestMessageHandler java.lang.Object
   |
   +----com.ibm.jma.message.handler.RequestMessageHandler

**************************************************************
public class RequestMessageHandler
extends Object
implements MessageHandler
The handler for handling request messages.

TABLE 7-continued

See Also:
    RequestMessage
\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*
Constructor Index

- RequestMessageHandler( )

Method Index

- getMessageTypes( )
    Gets the message types which can be handled by this message handler.
- handleMessage(Message)
    Handles the specified message.

Constructors

- RequestMessageHandler
public RequestMessageHandler( )

Methods

- handleMessage
public boolean handleMessage(Message reqc)
    Handles the specified message.
    Returns:
        true if the specified message can be handled.
- getMessageTypes
public String getMessageTypes( )
    Gets the message types which can be handled by this message handler.
    Returns:
        message types concatenated in a string and separated by spaces
\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*
All Packages   Class Hierarchy   This Package   Previous   Next   Index
All Packages   Class Hierarchy   This Package   Previous   Next   Index
\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*
Class
com.ibm.jma.message.handler.ResponseMessageHandler java.lang.Object
  |
  +----com.ibm.jma.message.handler.ResponseMessageHandler \*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*
public class ResponseMessageHandler
extends Object
implements MessageHandler
The handler for handling response messages.
See Also:
    Message
\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*
Constructor Index

- ResponseMessageHandler( )

Method Index

- getMessageTypes( )
    Gets the message types which can be handled by this message handler.
- handleMessage(Message)
    Handles the specified message.

Constructors

- ResponseMessageHandler
public ResponseMessageHandler( )

Methods

- handleMessage
public boolean handleMessage(Message msg)
    Handles the specified message.
    Returns:
        true if the specified message can be handled.
- getMessageTypes
public String getMessageTypes( )
    Gets the message types which can be handled by this message handler.
    Returns:
        message types concatenated in a string and separated by spaces
\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*
All Packages   Class Hierarchy   This Package   Previous   Next   Index

TABLE 8

Class Hierarchy class java.lang.Object
    class com.ibm.jma.agent.Agent (implements java.lang.Cloneable, com.ibm.jma.message.handler.MessageHandler)
    class com.ibm.jma.agent.AgentID (implements java.io.Serializable)
    class com.ibm.jma.agent.AgentManager (implements com.ibm.jma.message.handler.MessageHandler)
    class java.awt.Component (implements java.awt.image.ImageObserver, java.awt.MenuContainer, java.io.Serializable)
        class java.awt.Container
            class java.awt.Window
                class java.awt.Frame (implement java.awt.MenuContainer)
                      class com.ibm.jma.mail.impl.POServer (implements java.awt.event.ItemListener)
    class com.ibm.jma.message.handler.KQMLMessageHandler (implements com.ibm.jma.message.handler.MessageHandler)
        class com.ibm.jma.message.handler.KSQLMessageHandler
    class com.ibm.jma.mail.Mail (implements java.io.Serializable)
    interface com.ibm.jma.mail.MailQueue
    class com.ibm.jma.mail.Mailbox
    class com.ibm.jma.mail.impl.MemMailQueue (implements com.ibm.jma.mail.MailQueue)
    class com.ibm.jma.message.Message (implements java.io.Serializable)
        class com.ibm.jma.message.KQMLMessage
        class com.ibm.jma.message.RequestMessage
            class com.ibm.jma.message.ATRequestMessage
        class com.ibm.jma.message.ResponseMessage
            class com.ibm.jma.message.ATResponseMessage
    interface com.ibm.jma.message.handler.MessageHandler
    interface com.ibm.jma.mail.PostOffice
    interface com.ibm.jma.mail.impl.PostOfficeRemoteRMI (extends java.rmi.Remote)
    class java.rmi.server.RemoteObject (implements java.rmi.Remote, java.io.Serializable)
        class java.rmi.server.RemoteServer
            class java.rmi.server.UnicastRemoteObject
                class com.ibm.jma.mail.impl.PostOfficeRMI (implements com.ibm.jma.mail.impl.PostOfficeRemoteRMI, com.ibm.jma.mail.PostOffice)
    class com.ibm.jma.message.handler.RequestMessageHandler (implements com.ibm.jma.message.handler.MessageHandler)
        class com.ibm.jma.message.handler.ATRequestMessageHandler
    class com.ibm.jma.message.handler.ResponseMessageHandler (implements com.ibm.jma.message.handler.MessageHandler)
        class com.ibm.jma.message.handler.ATResponseMessageHandler
    class com.ibm.jma.mail.impl.SQLMailQueue (implements com.ibm.jma.mail.MailQueue)
    class java.lang.Throwable (implements java.io.Serializable)
        class java.lang.Exception
            class com.ibm.jma.agent.AgentException
            class com.ibm.jma.mail.impl.NoSuchMailException
            class com.ibm.jma.mail.impl.NotImplementedException
    class com.ibm.jma.mail.URL (implements java.io.Serializable)

TABLE 9

All Packages   Class Hierarchy
A B C D E F G H I J K L M N O P Q R S T U V W X Y Z
Index of all Fields and Methods

A action(Event, Object). Method in class com.ibm.jma.mail.impl.POServer
Agent(). Constructor for class com.ibm.jma.agent.Agent
AgentException(). Constructor for class com.ibm.jma.agent.AgentException
AgentException(String). Constructor for class com.ibm.jma.agent.AgentException
AgentID(byte[]). Constructor for class com.ibm.jma.agent.AgentID
    Constructs an agent identifier from the specified byte array representation.
AgentID(String). Constructor for class com.ibm.jma.agent.AgentID
    Constructs an agent identifier from the specified string representation.
ATRequestMessage(). Constructor for class com.ibm.jma.message.ATRequestMessage
ATRequestMessageHandler(). Constructor for class com.ibm.jma.message.handler.ATRequestMessageHandler
ATResponseMessage(Object). Constructor for class com.ibm.jma.message.ATResponseMessage
    Constructs an agent transfer response message with the specified result.
ATResponseMessageHandler(). Constructor for class com.ibm.jma.message.handler.ATResponseMessageHandler

TABLE 9-continued

All Packages   Class Hierarchy
A B C D E F G H I J K L M N O P Q R S T U V W X Y Z
Index of all Fields and Methods

C checkResult(). Method in class com.ibm.jma.message.RequestMessage
    Tests if the result has arrived.
close(). Method in interface com.ibm.jma.mail.MailQueue
    Closes this mail queue to disallow processing of mail.
close(). Method in class com.imb.jma.mail.impl.MemMailQueue
close(). Method in class com.ibm.jma.mail.impl.SQLMailQueue
createAgent(URL, String, Object). Method in class com.ibm.jma.agent.AgentManager
    Creates an agent with the specified codebase, class name, and initialization.

D

DEFAULT_AM_NAME. Static variabie in class com.ibm.jma.agent.AgentManager
DEFAULT_PORT_NUMBER. Static variable in class
com.ibm.jma.agent.AgentManager
DEFAULT_PROTOCOL. Static variable in class com.ibm.jma.agent.AgentManager
deliverMail(String, Mail). Method in interface
com.ibm.jma.mail.impl.PostOfficeRemoteRMI
deliverMail(String, Mail). Method in class com.ibm.jma.mail.impl.PostOfficeRMI
deliverMail(String, Mail[]). Method in interface
com.ibm.jma.mail.impl.PostOfficeRemoteRMI
deliverMail(String, Mail[]). Method in class com.ibm.jma.mail.impl.PostOfficeRMI
dequeue(). Method in interface com.ibm.jma.mail.MailQueue
    Removes a mail from this mail queue.
dequeue(). Method in class com.ibm.jma.mail.impl.MemMailQueue
dequeue(). Method in class com.imb.jma.mail.impl.SQLMailQueue
dequeue(byte[]). Method in interface com.ibm.jma.mail.MailQueue
    Removes a mail with the specified correlation id from this mail queue.
dequeue(byte[]). Method in class com.ibm.jma.mail.impl.MemMailQueue
dequeue(byte[]). Method in class com.ibm.jma.mail.impl.SQLMailQueue
dequeue(String). Method in interface com.ibm.jma.mail.MailQueue
    Removes a mail with the specified content type from this mail queue.
dequeue(String). Method in class com.ibm.jma.mail.impl.MemMailQueue
dequeue(String). Method in class com.imb.jma.mail.impl.SQLMailQueue
dispatchAgent(Agent, String). Method in class com.imb.jma.agent.AgentManager
    Dispatches an agent to the specified destination.

E enqueue(Mail). Method in interface com.ibm.jma.mail.MailQueue
    Adds a mail to this mail queue.
enqueue(Mail). Method in class com.ibm.jma.mail.impl.MemMailQueue
enqueue(Mail). Method in class com.imb.jma.mail.impl.SQLMailQueue
equals(Object). Method in class com.ibm.jma.agent.AgentID
    Test if the specified object is an agent identifier and is equal to this agent identifier.
equals(URL). Method in class com.ibm.jma.mail.URL

G getAgent(AgentID). Method in class com.ibm.jma.agent.AgentManager
    Gets the agent managed by this agent manager with the specified agent identifier.
getAgents(). Method in class com.imb.jma.agent.AgentManager
    Gets all agents managed by this agent manager.
getContent(). Method in class com.imb.jma.message.KQMLMessage
    Gets the content.
getContent(). Method in class com.ibm.jma.mail.Mail
    Returns the content of this mail.
getCorrelationId(). Method in class com.ibm.jma.mail.Mail
    Returns the correlation id.
getCorrelationId(). Method in class com.ibm.jma.message.ResponseMessage
    Gets the correlation id.
getDestination(). Method in class com.ibm.jma.mail.Mail
    Returns the destination of this mail.
getDestination(AgentID). Method in class com.ibm.jma.agent.AgentManager
    Gets the destination of the agent owned by this agent manager.
getFile(). Method in class com.ibm.jma.mail.URL
getHost(). Method in class com.ibm.jma.mail.URL
getID(). Method in class com.ibm.jma.agent.Agent
    Gets the identifier of this agent.
getID(). Method in class com.ibm.jma.agent.AgentID
    Gets the byte array representation of this agent identifier.
getInReplyTo(). Method in class com.ibm.jma.message.KQMLMessage
    Gets the identifier that this message is replying to.
getInReplyWith(). Method in Class com.ibm.jma.message.KQMLMessage
    Gets the identifier that this message is to be repled with.
getLanguage(). Method in class com.ibm.jma.message.jma.message.KQMLMessage
    Gets the content language.

TABLE 9-continued

All Packages Class Hierarchy
A B C D E F G H I J K L M N O P Q R S T U V W X Y Z
Index of all Fields and Methods getLocalAgentManager(). Static method in class com.ibm.jma.agent.AgentManager
    Gets the local agent manager.
getLocalPostOffice(). Static method in class com.ibm.jma.mail.impl.PostOfficeRMI
getMail(). Method in class com.ibm.jma.mail.Mailbox
    Gets (receives) a mail from this mailbox.
getMail(byte[]). Method in class com.ibm.jma.mail.Mailbox
    Gets (receives) a mail with the specified correlation id from this mailbox.
getMail(byte[], long). Method in class com.ibm.jma.mail.Mailbox
    Gets (receives) a mail with the specified correlation id from this mailbox, waiting if
    the mail arrives within the specified wait time.
getMail(long). Method in class com.ibm.jma.mail.Mailbox
    Gets (receives) a mail from this mailbox, waiting if the mail arrives within the
    specified wait time.
getMail(String). Method in class com.ibm.jma.mail.Mailbox
    Gets (receives) a mail with the specified content type from this mailbox.
getMail(String, long). Method in class com.ibm.jma.mail.Mailbox
    Gets (receives) a mail with the specified content type from this mailbox, waiting if
    the mail arrives within the specified wait time.
getMailId(). Method in class com.ibm.jma.mail.Mail
    Returns the mail id of this mail.
getManager(). Method in class com.ibm.jma.agent.Agent
    Gets the (current) agent manager of this agent.
getMessageId(). Method in class com.ibm.jma.message.RequestMessage
    Gets the message id.
getMessageTypes(). Method in class com.ibm.jma.agent.Agent
    Gets the message types which can be handled by this agent.
getMessageTypes(). Method in class com.ibm.jma.agent.AgentManager
    Gets the message types which can be handled by this agent manager.
getMessageTypes(). Method in class
com.ibm.jma.message.handler.ATRequestMessageHandler
    Gets the message types which can be handled by this message handler.
getMessageTypes(). Method in class
com.imb.jma.message.handler.ATResponseMessageHandler
    Gets the message types which can be handled by this message handler.
getMessageTypes(). Method in class
com.ibm.jma.message.handler.KQMLMessageHandler
    Gets the message types which can be handled by this message handler.
getMessageTypes(). Method in interface com.ibm.jma.message.handler.MessageHandler
    Gets the message types which can be handled by this message handler.
getMessageTypes(). Method in class
com.ibm.jma.message.handler.RequestMessageHandler
    Gets the message types which can be handled by this message handler.
getMessageTypes(). Method in class
com.ibm.jma.message.handler.ResponseMessageHandler
    Gets the message types which can be handled by this message handler.
getName(). Method in class com.ibm.jma.agent.AgentManager
    Gets the name of this agent manager.
getName(). Method in class com.ibm.jma.mail.Mailbox
    Returns the name of this mailbox.
getName(). Method in interface com.ibm.jma.mail.MailQueue
    Returns the name of this mail queue.
getName(). Method in class com.ibm.jma.mail.impl.MemMailQueue
getName(). Method in interface com.ibm.jma.mail.impl.PostOfficeRemoteRMI
getName(). Method in class com.ibm.jma.mail.impl.PostOfficeRMI
getName(). Method in class com.ibm.jma.mail.impl.SQLMailQueue
getName(). Method in class com.ibm.jma.mail.URL
getOntology(). Method in class com.ibm.jma.message.KQMLMessage
    Gets the content ontology.
getOperation(). Method in class com.ibm.jma.message.RequestMessage
    Gets the operation to be performed by the receiver of this message.
getParameters(). Method in class com.ibm.jma.message.ATResponseMessage
    Gets the parameters of the result.
getParameters(). Method in class com.ibm.jma.message.RequestMessage
    Gets the parameters of the operation.
getPerformative(). Method in class com.ibm.jma.message.KQMLMessage
    Gets the performative.
getPort(). Method in class com.ibm.jma.mail.URL
getPriority(). Method in class com.ibm.jma.mail.Mail
    Returns the priority of this mail
getProtocol(). Method in class com.ibm.jma.mail.URL
getReceiver(). Method in class com.ibm.jma.message.Message
    Gets the receiver of this message.
getReceiverMB(). Method in class com.ibm.jma.message.Message
    Gets the receiver mailbox of this message.
getRef(). Method in class com.ibm.jma.mail.URL TABLE 9-continued All Packages  Class Hierarchy
A B C D E F G H I J K L M N O P Q R S T U V W X Y Z
Index of all Fields and Methods getResponseDestination(). Method in class com.ibm.jma.mail.Mail
    Returns the response destination of this mail.
getResult(). Method in class com.ibm.jma.message.RequestMessage
    Gets the result.
getResult(). Method in class com.ibm.jma.message.ResponseMessage
    Gets the result that this message contains.
getResult(long). Method in class com.ibm.jma.message.RequestMessage
    Gets the result if it arrives within the specified wait time.
getSender(). Method in class com.ibm.jma.message.Message
    Gets the sender of this message.
getSenderMB(). Method in class com.ibm.jma.message.Message
    Gets the sender mailbox of this message.
getType(). Method in class com.ibm.jma.mail.Mail
    Returns the content type of this mail.
getURL(). Method in class com.ibm.jma.agent.AgentManager
    Gets the url of this agent manager.

H handleMessage(Message). Method in class com.ibm.jma.agent.Agent
    Handles the specified message.
handleMessage(Message). Method in class com.ibm.jma.agent.AgentManager
    Handles the specified message.
handleMessage(Message). Method in class
com.ibm.jma.message.handler.ATRequestMessageHandler
    Handles the specified message.
handleMessage(Message). Method in class
com.ibm.jma.message.handler.ATResponseMessageHandler
    Handles the specified message.
handleMessage(Message). Method in class
com.ibm.jma.message.handler.KQMLMessageHandler
    Handles the specified message.
handleMessage(Message). Method in class
com.ibm.jma.message.handler.KSQLMessageHandler
    Handles the specified message.
handleMessage(Message). Method in interface
com.ibm.jma.message.handler.MessageHandler
    Handles the specified message.
handleMessage(Message). Method in class
com.ibm.jma.message.handler.RequestMessageHandler
    Handles the specified message.
handleMessage(Message). Method in class
com.ibm.jma.message.handler.ResponseMessageHandler
    Handles the specified message.
hashCode(). Method in class com.ibm.jma.agent.AgentID
    Returns the hash code for this agent identifier.

I init(AgentManager, AgentID, Object). Method in class com.ibm.jma.agent.Agent
isClone(). Method in class com.ibm.jma.message.RequestMessage
    Tests if this message is a clone.
isEmpty(). Method in interface com.ibm.jma.mail.MailQueue
    Tests if this mail queue has no mail.
isEmpty(). Method in class com.ibm.jma.mail.impl.MemMailQueue
isEmpty(). Method in class com.ibm.jma.mail.impl.SQLMailQueue
isOneway(). Method in class com.ibm.jma.message.RequestMessage
    Tests if the messaging mode is one-way.
isRead(). Method in class com.ibm.jma.message.RequestMessage
    Tests if the result has been read.
isSent(). Method in class com.ibm.jma.message.RequestMessage
    Tests if this message has been sent.
itemStateChanged(ItemEvent). Method in class com.ibm.jma.mail.impl.POServer

K

KQMLMessage(). Constructor for class com.ibm.jma.message.KQMLMessage
    Constructs a KQML message.
KQMLMessageHandler(). Constructor for class
com.ibm.jma.message.handler.KQMLMessageHandler
KSQLMessageHandler(). Constructor for class
com.ibm.jma.message.handler.KSQLMessageHandler

M

Mail(). Constructor for class com.ibm.jma.mail.Mail
Mail.(Mail). Constructor for class com.ibm.jma.mail.Mail
Mail(String, Object). Constructor for class com.ibm.jma.mail.Mail
    Contructs a mail with the specified content type and content.

TABLE 9-continued

All Packages  Class Hierarchy
A B C D E F G H I J K L M N O P Q R S T U V W X Y Z
Index of all Fields and Methods Mailbox(String). Constructor for class com.ibm.jma.mail.Mailbox
    Constructs (opens) a mailbox with the specified name.
mailID. Variable in class com.ibm.jma.message.Message
main(String[]). Static method in class com.ibm.jma.mail.impl.POServer
MemMailQueue(). Constructor for class com.ibm.jma.mail.impl.MemMailQueue
Message(). Constructor for class com.ibm.jma.message.Message
minimumSize(). Method in class com.ibm.jma.mail.impl.POServer
N NoSuchMailException(). Constructor for class
com.ibm.jma.mail.impl.NoSuchMailException
NoSuchMailException(byte[]). Constructor for class
com.ibm.jma.mail.impl.NoSuchMailException
NotImplementedException(). Constructor for class
com.ibm.jma.mail.impl.NotImplementedException
NotImplementedException(Object). Constructor for class
com.ibm.jma.mail.impl.NotImplementedException
O open(). Method in interface com.ibm.jma.mail.MailQueue
    Opens this mail queue for processing of mail.
open(). Method in class com.ibm.jma.mail.impl.MemMailQueue
open(). Method in class com.ibm.jma.mail,impl.SQLMailQueue
P POServer(String). Constructor for class com.ibm.jma.mail.impl.POServer
preferredSize(). Method in class com.ibm.jma.mail.impl.POServer
putMail(Mail). Method in class com.ibm.jma.mail.Mailbox
    Puts a mail in this mailbox (i.e., sends a mail to this mailbox).
R receiveMail(String). Method in interface com.ibm.jma.mail.PostOffice
    This method receives mail from a mailbox with name "mbName"
receiveMail(String). Method in class com.ibm.jma.mail.impl.PostOfficeRMI
receiveMail(String, byte[]). Method in interface com.ibm.jma.mail.PostOffice
    This method receives mail that has a correlation id "corrId" from the mail box of
    name "mbName"
receiveMail(String, byte[]). Method in class com.ibm.jma.mail.impl.PostOfficeRMI
receiveMail(String, byte[], long). Method in interface com.ibm.jma.mail.PostOffice
    This method receives mail with correlation id "corrId" with timed wait of
    "waitTime" milliseconds from mailbox "mbName" when it times out a null mail
    object is returned
receiveMail(String. byte[], long). Method in class com.ibm.jma.mail.impl.PostOfficeRMI
receiveMail(String, long). Method in interface com.ibm.jma.mail.PostOffice
    This method receives mail with timed wait of "waitTime" milliseconds from a
    mailbox "mbName".
receiveMail(String, long). Method in class com.ibm.jma.mail.impl.PostOfficeRMI
receiveMail(String, String). Method in interface com.ibm.jma.mail.PostOffice
    This method receives mail of type "type" from a mailbox with name "mbName"
receiveMail(String). Method in class com.ibm.jma.mail.impl.PostOfficeRMI
receiveMail(String, String, long). Method in interface com.ibm.jma.mail.PostOffice
    This method receives mail of type "type" with timed wait of "waitTime" milliseconds
    from mailbox "mbName" when it times out a null mail object is returned
receiveMail(String, String, long). Method in class com.ibm.jma.mail.impl.PostOfficeRMI
RequestMessage(). Constructor for class com.ibm.jma.message.RequestMessage
    Constructs a request message.
RequestMessageHandler(). Constructor for class
com.ibm.jma.message.handler.RequestMessageHandler
ResponseMessage(Object). Constructor for class
com.ibm.jma.message.ResponseMessage
    Constructs a response message with the specified result.
ResponseMessageHandler(). Constructor for class
com.ibm.jma.message.handler.ResponseMessageHandler
retrieveAgent(AgentID). Method in class com.ibm.jma.agent.AgentManager
    Retrieves the agent with the specified agent identifier.
retrieveMail(String, byte[], long). Method in interface
com.ibm.jma.mail.impl.PostOfficeRemoteRMI
retrieveMail(String, byte[], long). Method in class com.ibm.jma.mail.impl.PostOfficeRMI
retrieveMail(String, long). Method in interface
com.ibm.jma.mail.impl.PostOfficeRemoteRMI
retrieveMail(String, long). Method in class com.ibm.jma.mail.impl.PostOfficeRMI
retrieveMail(String, String, long). Method in interface
com.ibm.jma.mail.impl.PostOfficeRemoteRMI
retrieveMail(String, String, long). Method in class com.ibm.jma.mail.impl.PostOfficeRMI
S TABLE 9-continued All Packages   Class Hierarchy
A B C D E F G H I J K L M N O P Q R S T U V W X Y Z
Index of all Fields and Methods

--- send(). Method in class com.ibm.jma.message.Message
    Sends this message to the receiver.
send(). Method in class com.ibm.jma.message.RequestMessage
    Sends this message.
sendMail(String, Mail). Method in interface com.ibm.jma.mail.PostOffice
    This method sends a mail "mail" to a mailbox with name "mbName"
sendMail(String, Mail). Method in class com.ibm.jma.mail.impl.PostOfficeRMI
sendMessage(AgentID, Message). Method in class com.ibm.jma.agent.AgentManager
    Sends the specified message to the agent with the specified identifier.
setClone(). Method in class com.ibm.jma.message.RequestMessage
    Indicates that this message is a clone.
setContent(Object). Method in class com.ibm.jma.message.KQMLMessage
    Sets the content.
setCorrelationId(byte[ ]). Method in class com.ibm.jma.mail.Mail
    Sets the correlation id for the mail that this mail corresponds to.
setCorrelationId(byte [ ]). Method in class com.ibm.jma.message.ResponseMessage
    Sets the correlation id for the corresponding request message.
setDestination(String). Method in class com.ibm.jma.mail.Mail
    Sets the destination of this mail
setInReplyTo(String). Method in class com.ibm.jma.message.KQMLMessage
    Sets the identifier that this message is replying to.
setLanguage(String). Method in class com.ibm.jma.message.KQMLMessage
    Sets the content language.
setMailID(byte[ ]). Method in class com.ibm.jma.mail.Mail
    Sets the mail id of this mail.
setMessageID(byte[ ]). Method in class com.ibm.jma.mesage.RequestMessage
    Sets the message id.
setOneway(). Method in class com.ibm.jma.message.RequestMessage
    Sets the messaging mode to one-way.
setOntology(String). Method in class com.ibm.jma.message.KQMLMessage
    Sets the content ontology.
setOperation(String). Method in class com.ibm.jma.message.RequestMessage
    Sets the operation to be performed by the receiver of this message.
setParameters(Hashtable). Method in class com.ibm.jma.message.ATResponseMessage
    Sets the parameters of the result.
setParameters(Hashtable). Method in class com.ibm.jma.message.RequestMessage
    Sets the parameters of the operation.
setPerformative(String). Method in class com.ibm.jma.message.KQMLMessage
    Sets the performative.
setPriority(int). Method in class com.ibm.jma.mail.Mail
    Sets the priority of this mail.
setReceiver(String). Method in class com.ibm.jma.message.Message
    Sets the receiver of this message.
setRef(String). Method in class com.ibm.jma.mail.URL
setReplyWith(String). Method in class com.ibm.jma.message.KQMLMessage
    Sets the identifier that this message is to be repled with.
setResponseDestination(String). Method in class com.ibm.jma.mail.Mail
    Sets the response destination of this mail.
setSender(String). Method in class com.ibm.jma.message.Message
    Sets the sender of this message.
size(). Method in interface com.ibm.jma.mail.MailQueue
    Returns the number of mail in this mail queue.
size(). Method in class com.ibm.jma.mail.impl.MemMailQueue
size(). Method in class com.ibm.jma.mail.impl.SQLMailQueue
SQLMailQueue(String). Constructor for class com.ibm.jma.mail.impl.SQLMailQueue
T toString(). Method in class com.ibm.jma.agent.AgentID
    Gets the string representation of this agent identifier.
toString(). Method in class com.ibm.jma.mail.Mail
    Returns a string representing this mail.
toString(). Method in class com.ibm.jma.mail.URL
U URL(String). Constructor for class com.ibm.jma.mail.URL
URL(String, String, int, String). Constructor for class com.ibm.jma.mail.URL

---

We claim:

1. A method of asynchronously communicating a mail between distributed objects located on a plurality of computer systems, said plurality of computer systems comprising a local computer system and a remote computer system from each other, said method comprising the steps of:

creating the mail on the local computer system from the plurality of computer systems to be delivered to a destination, wherein the destination is located on the remote computer system from the plurality of computer systems, the mail having a level of abstraction comprising a type not requiring a name registration and a name of the mail;

creating a first virtual mailbox, created for, associated with, and representing the destination for the mail, wherein the first virtual mailbox is located on the local computer system from the plurality of computer systems, the first virtual mailbox having a level of abstraction wherein the destination is represented by a name of the first virtual mailbox;

putting the mail in the first virtual mailbox located on the local computer system; and sending the mail from the first virtual mailbox located on the local computer system to the destination, wherein the sending is performed by a post office having a level of abstraction comprising a post office name representing a location and an identification of the post office.

2. The method of claim 1 wherein the creating step further comprises specifying a content of the mail and a type of the content.

3. The method of claim 1 wherein the creating step further comprises setting a response destination for the mail so that a reply may be returned to the response destination.

4. The method of claim 1 further comprising the step of associating a virtual mailbox name with the first virtual mailbox wherein the virtual mailbox name comprises a destination post office name and a mailbox id.

5. The method of claim 1 further comprising the steps of:

creating a second virtual mailbox, created for, associated with, and representing the destination for the mail, wherein the second virtual mailbox is located on the remote computer system from the plurality of computer systems; and getting the mail from the second virtual mailbox located on the remote computer system.

6. The method of claim 5 further comprising the steps of:

getting a first local post office responsive to the putting of the mail in the first virtual mailbox;

finding a destination post office by the first local post office;

sending the mail via the first local post office to the destination post office;

getting a second local post office responsive to the getting of the mail from the second virtual mailbox;

finding the destination post office by the second local post office;

retrieving the mail from the destination post office to second local post office; and receiving the mail by the second virtual mailbox via the second local post office.

7. The method of claim 6 wherein the destination post office and the second local post office are the same post office.

8. The method of claim 6 wherein the destination post office and the first local post office are the same post office.

9. The method of claim 8 wherein the post office name comprises a protocol, host, port, and post office id.

10. An article of manufacture for use in a distributed computer system for asynchronously communicating a mail between distributed objects located on a plurality of computer systems, said plurality of computer systems comprising a local computer system and a remote computer system from each other, said article of manufacture comprising a computer-readable storage medium having a computer program embodied in said medium which may cause the distributed computer system to:

create the mail on the local computer system from the plurality of computer systems to be delivered to a destination, wherein the destination is located on the remote computer system from the plurality of computer systems, the mail having a level of abstraction comprising a type not requiring a name registration and a name of the mail;

create a first virtual mailbox, created for, associated with, and representing the destination for the mail, wherein the first virtual mailbox is located on the local computer system from the plurality of computer systems, the first virtual mailbox having a level of abstraction wherein the destination is represented by a name of the first virtual mailbox;

put the mail in the first virtual mailbox located on the local computer system; and send the mail from the first virtual mailbox located on the local computer system to the destination, wherein the sending is performed by a post office having a level of abstraction comprising a post office name representing a location and an identification of the post office.

11. The article of manufacture of claim 10 wherein the computer program in causing the creation of the mail may further cause the distributed computer system to specify a content of the mail and a type of the content.

12. The article of manufacture of claim 10 wherein the computer program in causing the creation of the mail may further cause the distributed computer system to set a response destination for the mail so that a reply may be returned to the response destination.

13. The article of manufacture of claim 10 wherein the computer program may further cause the distributed computer system to associate a virtual mailbox name with the first virtual mailbox wherein the virtual mailbox name comprises a destination post office name and a mailbox id.

14. The article of manufacture of claim 10 wherein the computer program may further cause the distributed computer system to:

create a second virtual mailbox, created for, associated with, and representing the destination for the mail, wherein the second virtual mailbox is located on the remote computer system from the plurality of computer systems; and get the mail from the second virtual mailbox located on the remote computer system.

15. The article of manufacture of claim 14 wherein the computer program may further cause the distributed computer system to:

get a first local post office responsive to the putting of the mail in the first virtual mailbox;

find a destination post office by the first local post office;

send the mail via the first local post office to the destination post office;

get a second local post office responsive to the getting of the mail from the second virtual mailbox;

find the destination post office by the second local post office;

retrieve the mail from the destination post office to second local post office; and receive the mail by the second virtual mailbox via the second local post office.

16. The article of manufacture of claim 15 wherein the destination post office and the second local post office are the same post office.

17. The article of manufacture of claim 15 wherein the destination post office and the first local post office are the same post office.

18. The article of manufacture of claim 17 wherein the post office name comprises a protocol, host, port, and post office id.

19. A distributed computer system for asynchronously communicating a mail between distributed objects located on a plurality of computer systems, said plurality of computer systems comprising a local computer system and a remote computer system from each other, said distributed computer system comprising:

a mail created on the local computer system from the plurality of computer systems to be delivered to a destination, wherein the destination is located on the remote computer system from the plurality of computer systems, the mail having a level of abstraction comprising a type not requiring a name registration and a name of the mail;

a first virtual mailbox, created for, associated with, and representing the destination for the mail, wherein the first virtual mailbox is located on the local computer system from the plurality of computer systems, the first virtual mailbox having a level of abstraction wherein the destination is represented by a name of the first virtual mailbox;

program code for putting the mail in the first virtual mailbox located on the local computer system; and program code for sending the mail from the first virtual mailbox located on the local computer system to the destination, wherein the sending is performed by a post office having a level of abstraction comprising a post office name representing a location and an identification of the post office.

20. The distributed computer system of claim 19 wherein the creating program code further comprises:

program code for specifying a content of the mail and a type of the content.

21. The distributed computer system of claim 19 wherein the creating program code further comprises:

program code for setting a response destination for the mail so that a reply may be returned to the response destination.

22. The distributed computer system of claim 19 further comprising:

program code for associating a virtual mailbox name with the first virtual mailbox wherein the virtual mailbox name comprises a destination post office name and a mailbox id.

23. The distributed computer system of claim 19 further comprising:

a second virtual mailbox, created for, associated with, and representing the destination for the mail, wherein the second virtual mailbox is located on the remote computer system from the plurality of computer systems; and program code for getting the mail from the second virtual mailbox located on the remote computer system.

24. The distributed computer system of claim 23 further comprising:

program code for getting a first local post office responsive to the putting of the mail in the first virtual mailbox;

program code for finding a destination post office by the first local post office;

program code for sending the mail via the first local post office to the destination post office;

program code for getting a second local post office responsive to the getting of the mail from the second virtual mailbox;

program code for finding the destination post office by the second local post office;

program code for retrieving the mail from the destination post office to second local post office; and program code for receiving the mail by the second virtual mailbox via the second local post office.

25. The distributed computer system of claim 24 wherein the destination post office and the second local post office are the same post office.

26. The distributed computer system of claim 24 wherein the destination post office and the first local post office are the same post office.

27. The distributed computer system of claim 26 wherein the post office name comprises a protocol, host, port, and post office id.

* * * * *